(12) United States Patent
Hillis et al.

(10) Patent No.: US 7,773,108 B2
(45) Date of Patent: *Aug. 10, 2010

(54) METHOD OF MAINTAINING EYE CONTACT IN VIDEO CONFERENCING USING VIEW MORPHING

(75) Inventors: W. Daniel Hillis, Toluca Lake, CA (US); Bran Ferren, Beverly Hills, CA (US); Russel Howe, Montrose, CA (US)

(73) Assignee: Applied Minds, Inc., Glendale, CA (US)

( * ) Notice: Subject to any disclaimer, the term of this patent is extended or adjusted under 35 U.S.C. 154(b) by 923 days.

This patent is subject to a terminal disclaimer.

(21) Appl. No.: 11/565,496

(22) Filed: Nov. 30, 2006

(65) Prior Publication Data

US 2007/0159523 A1      Jul. 12, 2007

Related U.S. Application Data

(63) Continuation of application No. 10/691,930, filed on Oct. 22, 2003, now Pat. No. 7,202,887.

(51) Int. Cl.
*H04N 7/14* (2006.01)
*G06K 9/36* (2006.01)
(52) U.S. Cl. ............... 348/14.16; 348/14.08; 348/14.09
(58) Field of Classification Search ... 348/14.01–14.16; 382/100, 150, 284, 294, 291, 300
See application file for complete search history.

(56) References Cited

U.S. PATENT DOCUMENTS 5,117,285 A    5/1992   Nelson et al.
5,359,162 A    10/1994  Bitko
5,359,362 A *  10/1994  Lewis et al. ................. 348/14.1
5,500,671 A    3/1996   Anderson et al.
5,612,734 A    3/1997   Nelson et al.
5,821,943 A    10/1998  Shashua
6,094,198 A    7/2000   Shashua
6,208,373 B1 * 3/2001   Fong et al. ............... 348/14.16
6,219,444 B1 * 4/2001   Shashua et al. ............. 382/154

OTHER PUBLICATIONS

Colorspace Faq; Frequently Asked Question About Gamma and Color; Jul. 2001; Toronto, CN.
Compaq Internet Devices; Jun. 2001; http:..athome.compaq.com/showroon/static/ipaq/music_center.asp.
Charles Poynton; www.inforamp.net; Dec. 1999.
Andrea Fusiello, Emmanuel Trucco, and Alessandro Verri ; Retification With Constrainted Stereo Geometry.
Janne Heikkila and Olli Silven; Four-Step Camera Calibration Procedure with Implicit Image Correction; University of Oulu, Finland.

(Continued)

*Primary Examiner*—Melur Ramakrishnaiah
(74) *Attorney, Agent, or Firm*—Michael A. Glenn; Glenn Patent Group

(57) ABSTRACT

A view morphing algorithm is applied to synchronous collections of video images from at least two video imaging devices, and interpolating between the images, creates a composite image view of the local participant. This composite image approximates what might be seen from a point between the video imaging devices, presenting the image to other video session participants.

11 Claims, 18 Drawing Sheets

OTHER PUBLICATIONS

Georges M. Quinot; The "Orthogonal Algorith" For Optical Flow Detection Using Dynamic Programming; France; Laboratoirie Systeme de Perception.

Peter F. Strum, Steven J. Maybank, On Plane-Based Camera Calibration: A General Algorithm, Singularities, Applications; University of Reading Whiteknights, UK.

http://www.cs.cmu.edu; Virtualized Reality; The Robotics Institute.

http://zaxel.com/virtualviewpoint/about.html; Virtual Viewpoint; About Zaxel Virtual Viewpoint Technology.

Zhengyou Zhang; Flexible Camera Calibration by Viewing a Plane from Unknown Orientation; Microsoft Research, Redmond, WA.

* cited by examiner

METHOD OF MAINTAINING EYE CONTACT IN VIDEO CONFERENCING USING VIEW MORPHING

CROSS-REFERENCE TO RELATED APPLICATIONS

This application is a Continuation of U.S. patent application Ser. No. 10/691,930 filed Oct. 22, 2003, now U.S. Pat. No. 7,202,887 which claims priority to U.S. patent application Ser. No. 09/995,272, filed on Nov. 27, 2001, which claims priority to Provisional Application Ser. No. 60/250,955, filed on Nov. 29, 2000.

BACKGROUND OF THE INVENTION

1. Technical Field

This invention relates to the field of video conferencing and in particular to methods and systems maintaining the appearance of eye contact between communicants in a teleconference.

2. Background Art

A primary concern with video teleconferencing systems is the frequent lack of eye contact between participants. In the most common configuration, each participant uses a computer monitor on which an image of the second participant is displayed, while a camera mounted above the monitor captures the image of the local participant for display on the monitor of the second participant. Since participants frequently look at the monitor, either at the image of the second participant or elsewhere on the display, rather than directly at the video camera, there is the appearance that the participants are not looking at one another, resulting in an unsatisfactory user experience.

Many prior art solutions to the eye contact problem have incorporated half-silvered, partially transmissive and partially reflective mirrors, or beamsplitters. These solutions have typically incorporated a beamsplitter placed in front of a computer display at a 45 degree angle. In one typical configuration, a video camera, located behind the beamsplitter, captures an image of the local participant through the beamsplitter. The local participant views an image of the second participant on the display as reflected by the beamsplitter.

In devices incorporating a conventional CRT, the resulting device is both aesthetically bulky and physically cumbersome. Furthermore, in cases involving an upward facing display, the display is viewable both directly and as reflected by the beamsplitter, greatly distracting the local participant. To alleviate this problem, prior solutions, including those described in U.S. Pat. Nos. 5,117,285 and 5,612,734 have introduced complicated systems involving polarizers or micro-louvers to obstruct a direct view of the upward facing display by the local participant. In all cases, the image of the second participant appears recessed within the housing holding the display, beamsplitter, and video camera. The resulting distant appearance of the second participant greatly diminishes the sense of intimacy sought during videoconferencing.

Another series of prior art attempts to alleviate this problem through the use of computational algorithms that manipulate the transmitted or received video image.

For example, U.S. Pat. No. 5,500,671 describes a system that addresses the eye contact problem by creating an intermediate three-dimensional model of the participant based on images captured by two imaging devices on either side of the local display. Using this model, the system repositions artificially generated eyes at an appropriate position within the image of the local participant transmitted to the second participant. The resulting image, with artificially generated eyes and a slight but frequent mismatch between the position of the eyes relative to the head and body of the participant, is unnatural in appearance. Furthermore, the creation of an intermediate three-dimensional model is computationally intensive, making it difficult to implement in practice.

U.S. Pat. No. 5,359,362 describes a system "using at each station of a video conferencing system at least a pair of cameras, neither of which is on the same optical axis as the local monitor, to obtain a three-dimensional description of the speaker and from this description obtaining for reproduction by the remote monitor at, the listener's station a virtual image corresponding to the view along the optical axis of the camera at the speaker's station. The partial 3D description at the scene can be used to construct an image of the scene from various desired viewpoints. The three dimensional description is most simply obtained by viewing the scene of interest, by a pair of cameras, typically preferably aligned symmetrically on either left and right or above and below, about the optical axis of the monitor, solving the stereo correspondence problem, and then producing the desired two dimensional description of the virtual image for use by the monitor at the listener's station.

(The) process of creating the desired two-dimensional description for use as the virtual image consists of four steps, calibration, stereo matching, reconstruction and interpolation. The calibration converts the view from two tilted cameras into two parallel views important for stereo matching. The stereo matching step matches features, such as pixels, between the two views to obtain a displacement map that provides information on the changes needed to be made in one of the observed views. The reconstruction step constructs the desired virtual view along the axis between the two cameras from the displacement map and an observed view, thereby recovering eye contact. The final step is to fill in by interpolation areas where complete reconstruction is difficult because of gaps in the desired virtual view that result from limitations in the displacement map that was formed."

Note that U.S. Pat. No. 5,359,362 generates its virtual image by transforming the image obtained by one of the two physical imaging devices. The resulting image does not reflect any features of the local participant that are occluded from the transformed image.

Still other prior art approaches construct a complete mathematical model of the local participant and his nearby surroundings. This mathematical model is then transmitted to the second participant, where it is reconstructed in a manner providing eye contact. Clearly, such systems require that both the remote and local communicants own and operate the same videoconferencing device. This presents a significant obstacle to introduction and widespread adoption of the device.

Consider the prior art as found in U.S. Pat. No. 5,359,632 again. Often, in such stereo matching systems, prior to beginning real-time video conferencing image processing, a calibration operation is used to obtain information describing the positioning and optical properties of the imaging devices. First a camera projection matrix is determined for each of the imaging devices. This camera projection matrix characterizes the correspondence of a point in three-dimensional space to a point in the projective plane imaged by the video camera. The matrix determined is dependent on the position and angular alignment of the camera as well as the radial distortion and zoom factor of the camera lens. One prior art approach employs test patterns and a camera calibration toolbox developed by Jean-Yves Bouguet at the California Institute of Technology. This calibration toolbox draws upon methods described in the papers entitled "Flexible Camera Calibration by Viewing a Plane from Unknown Orientations" by Zhang, "A Four-step Camera Calibration Procedure with Implicit Image Correction" by Heikkilä and Silven, "On Plane-Based Camera Calibration: A General Algorithm, Singularities, Applications" by Sturm, and "A versatile camera calibration technique for high accuracy 3D machine vision metrology using off-the-shelf TV cameras and lenses" by R. Y. Tsa and Maybank.

Following the determination of these camera projection matrices, a two dimensional rectifying transform is determined for each of the pair of imaging devices. The transformation may be determined based on the previously determined camera projection matrices, using an approach described in the paper of Fusiello, Trucco, and Verri entitled "Rectification with unconstrained stereo geometry". The transformation, when applied to a pair of images obtained from the imaging devices, produces a pair of rectified images. In such a set of images, each pixel in a first video camera image corresponds to a pixel in the second image located along a line at the same vertical location as the pixel in the first image.

The prior art also includes calculating a dense correspondence between the two generated camera images. Several algorithms are available for determining such a dense correspondence including the method described in the paper of Georges M. Quenot entitled "The 'Orthogonal Algorithm' for Optical Flow Detection Using Dynamic Programming". The Abstract states "This paper introduces a new and original algorithm for optical flow detection. It is based on an iterative search for a displacement field that minimizes the $L_1$ or $L_2$ distance between two images. Both images are sliced into parallel and overlapping strips. Corresponding strips are aligned using dynamic programming exactly as 2D representations of speech signal are with the DTW algorithm. Two passes are performed using orthogonal slicing directions. This process is iterated in a pyramidal fashion by reducing the spacing and width of the strips. This algorithm provides a very high quality matching for calibrated patterns as well as for human visual sensation. The results appears to be at least as good as those obtained with classical optical flow detection methods."

What is needed is a method for efficient real-time processing of at least two spatially offset image sequences to create a virtual image sequence providing a sense of eye contact, which is of great value in a number of applications including, but not limited to, video conferencing. The sense of eye contact should operate effectively across the full range of local participant head positions and gaze directions. It must provide a natural view of the local participant for the second participant. It must be aesthetically pleasing and easily operated by a typical user. What is further needed is apparatus efficiently interfacing to a standard video conferencing system and providing the advantages of such methods of generating virtual image sequences.

SUMMARY OF THE INVENTION

To resolve the identified problems found in the prior art, the present invention creates a head-on view of a local participant, thereby enhancing the sense of eye contact provided during any of the following: a video conference session, a video phone session, a session at a video kiosk, and a video training session. Note that video conference sessions include, but are not limited to, sessions presented via one or more private communications channels and sessions presented via one or more broadcast channels.

A view morphing algorithm is applied to a synchronous collection of images from at least two video imaging devices. These images are interpolated to create interpolation images for each of the video imaging devices. The interpolated images from at least two of the video imaging devices are combined to create a composite image of the local participant. This composite image approximates a head-on view of the local participant providing excellent eye contact.

It should be noted that the synchronous image collection is comprised of images received at approximately the same time.

It is often preferred to interpolate the images to a point between the video imaging devices when they are placed in a radially symmetric manner about the local participant. It may be preferred, when the video imaging devices are not placed in a radially symmetric relationship with the local participant, that a more complex mechanism potentially involving partial extrapolation may be used to create what is identified herein as the interpolated images.

The video imaging devices are preferably placed on opposite sides of a local display and the composite image further approximates essentially what might be seen from the center of that local display.

This head-on view of the local participant supports the local participant looking directly at the monitor and provides a sense of eye contact when viewed by the second participant, actively aiding the sense of personal interaction for all participants.

Certain embodiments of the invention include, but are not limited to, various schemes supporting generation of the composite image, control of composite image generation by at least one of the second participants, and adaptively modifying the current images at certain stages based upon remembered displacements from previous images. These embodiments individually and collectively aid in improving the perceived quality of eye contact.

Aspects of the invention include, but are not limited to, devices implementing the methods of this invention in at least one of the following forms: dedicated execution engines, with or without instruction processing mechanisms; mechanisms involving table lookup of various non-linear functions; and at least one instruction processing computer performing at least some of the steps of the methods as program steps residing within memory accessibly coupled with the computer.

These and other advantages of the present invention will become apparent upon reading the following detailed descriptions and studying the various figures of the drawings.

DETAILED DESCRIPTION OF THE INVENTION

Figure 1A:
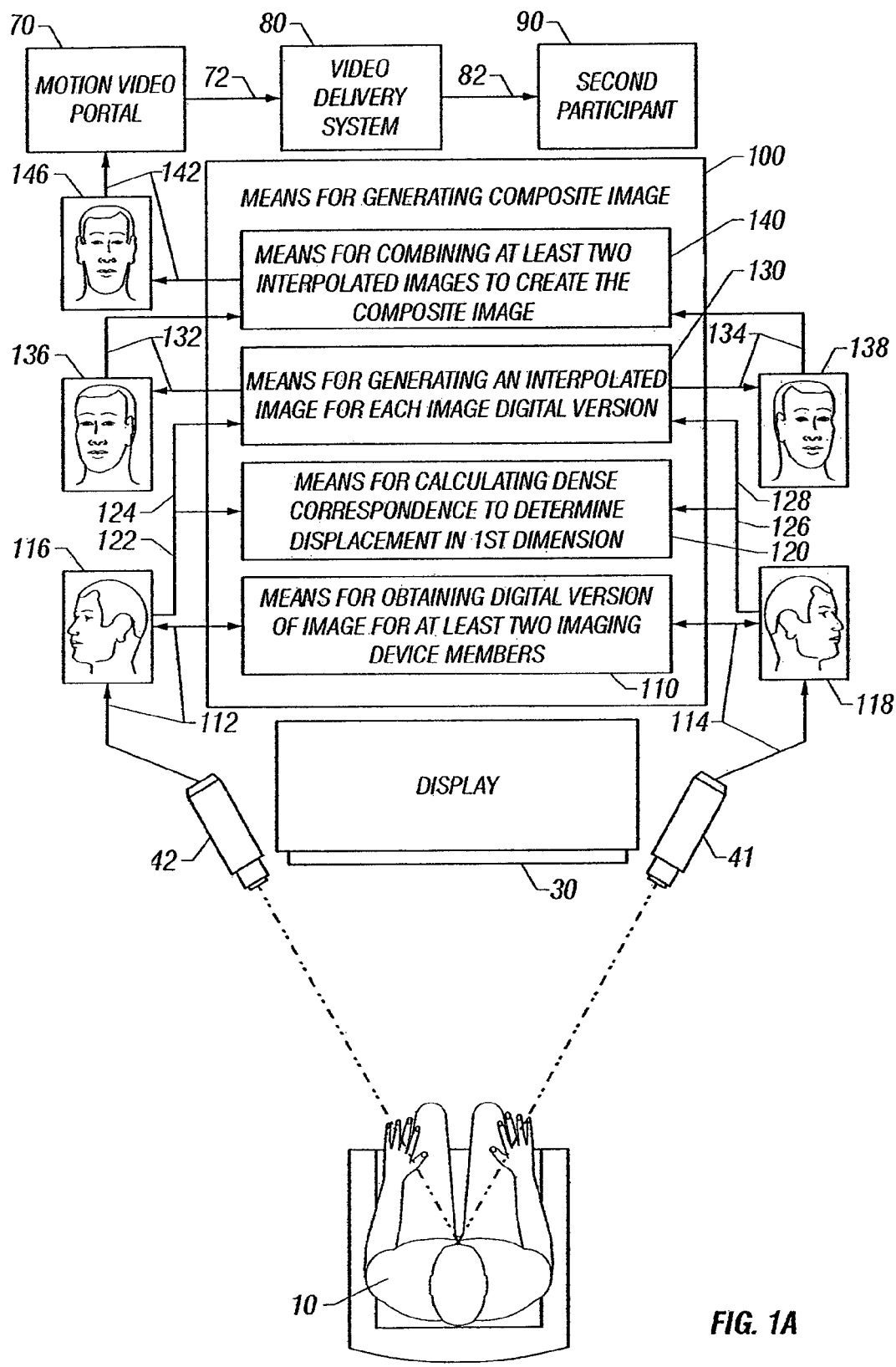
FIG. 1A shows a simplified block diagram overview of the invention, including local participant 10, video display 30, pair of imaging devices 41 and 42, means for generating composite image 100, motion video portal 70, video delivery system 80 and second participant 90.

FIG. 1A shows a simplified block diagram overview of the invention, including local participant 10, video display 30, pair of imaging devices 41 and 42, means for generating composite image 100, motion video portal 70, video delivery system 80 and second participant 90.

Means 100 for generating composite image 146 is communicatively coupled 114 and 112 with at least two imaging device collection members 41 and 42, respectively. Means 100 regularly receives an image 118 and 116 from each of the at least two imaging device collection members 41 and 42, respectively, to provide a synchronized collection of images based upon observations of at least the local participant's head 10 by the imaging devices.

Means 100 for generating composite image 146 is communicatively coupled 142 to motion video portal 70, providing a succession of composite images 146, each based upon at least synchronized image collection 116 and 118 to 72 video delivery system 80.

Video delivery system 80 presents 82 second participant 90 motion video stream 72 generated by motion video portal 70 conveying eye contact based upon the succession of composite images 146. Note that the motion video stream is compatible with a digital motion format and/or an analog motion format. The digital motion format includes; for example, any of the following: MPEG1 format, MPEG2 format, MPEG4 format, H.261 format and H.263 format. The analog format includes, for example, any of the following: NTSC format, PAL format, and SECAM format.

A primary responsibility of video delivery system 80 is to initiate and maintain a video delivery session with at least one remote location. Note that in various embodiments of the invention, the video delivery session may include, but is not limited to, any of the following: a video conference session involving at least local participant 10 and at least one second participant 80, a video phone session involving local participant 10 and second participant 80, a video kiosk supporting video communication between at least local participant 10 and at least one second participant 80, video training between at least local participant 10 and at least one second participant 80, and television broadcast conveying a documentary style interview. Each of these video delivery sessions is based upon the motion video stream presented 72 to the video delivery system 80 from motion video portal 70.

Video delivery system 80 connects 82 to second participant 90. The connection 82 can include transport across at least one communications network. While not shown, there is typically another motion video stream from second participant 90 which is transported via 82 through video delivery system 80 and rendered for presentation on video display 30.

Additionally, certain embodiments of the invention may offer an ability to view the composite image 146 obtained from means 100 on the local video display 30. There may further be the ability to view digital versions of the images 118 and 116 obtained from the video imaging devices 41 and 42.

A number of existing technologies are suitable for use as video display 30 including, for example, cathode ray tube monitors, liquid crystal displays, and plasma screen televisions. The display is preferably compatible with the format of the video output signal provided by the video delivery system.

Note that in certain embodiments of the invention, means 100 may be at least part of an instruction-processing computer and/or a dedicated hardware accelerator.

Note that as used herein, an instruction-processing computer includes, but is not limited to, single instruction and multiple instruction processing mechanisms acting upon single datapaths and multiple datapaths, leading to the often used acronyms of SISD, SIMD, MISD, and MIMD computers.

The instructions processed by instruction processing mechanisms include, but are not limited to, instructions which are directly executed to alter the state of the system they control, as well as instructions which alter by inference the state of the system they control. Note that instruction execution may be hardwired into the instruction processor, or interpreted. Inferential systems include, but are not limited to, artificial neural networks, logic programming systems, and content addressable memory driven control systems.

As used herein, a dedicated hardware accelerator provides at least one means by which calculations upon picture entities, preferably at least pixel components, may be performed. A dedicated hardware accelerator may or may not include an instruction processing control mechanism.

By way of example, a hardware accelerator may include a state machine controller operating at least one partition of its controls as a ones-hot state machine. It may be a collection of state machines, with at least one, some or all of these state machines not having an instruction register. Examples of such state machines often include, but are not limited to, floating point calculators, FIFOs, and bit packing circuits such as Huffman coders and decoders.

Local participant 10 of the video delivery session is observed by at least a pair of video imaging devices 41 and 42. The imaging device collection members 41 and 42 are collectively disposed to reveal essential features, for example, the head of local participant 10 for observation by at least one of imaging device collection members 41 and 42.

Note that each of the digital versions of images 118 and 116 is comprised of a two-dimensional array of pixels of approximately the same size and shape. For the sake of discussion, video imaging device 41 is the first imaging device and video imaging device 42 is the second imaging device.

Means 100 is comprised of the following:

Means 110 for obtaining a digital version of the image 118 and 116 from each of at least two imaging device collection members 41 and 42, respectively, as the image member in the synchronized image collection.

One embodiment of the invention comprises means 120 for calculating a dense correspondence to determine a displacement in at least a first dimension for each of the pixels in the first image digital version 116 to move each of the pixels to a most nearly corresponding pixel in the image digital versions of at least one other member of the imaging device collection 118.

Means 130 for generating an interpolated image 136 and 138, for each of the imaging device collection members 41 and 42, respectively. The interpolated images 136 and 138 are comprised of a two dimensional array of pixels of approximately the same size and shape.

Means 140 for combining at least two of the interpolated images 136 and 138 employs a partitioned averaging scheme using at least a second dimension to create the composite image 146.

Figure 13A:
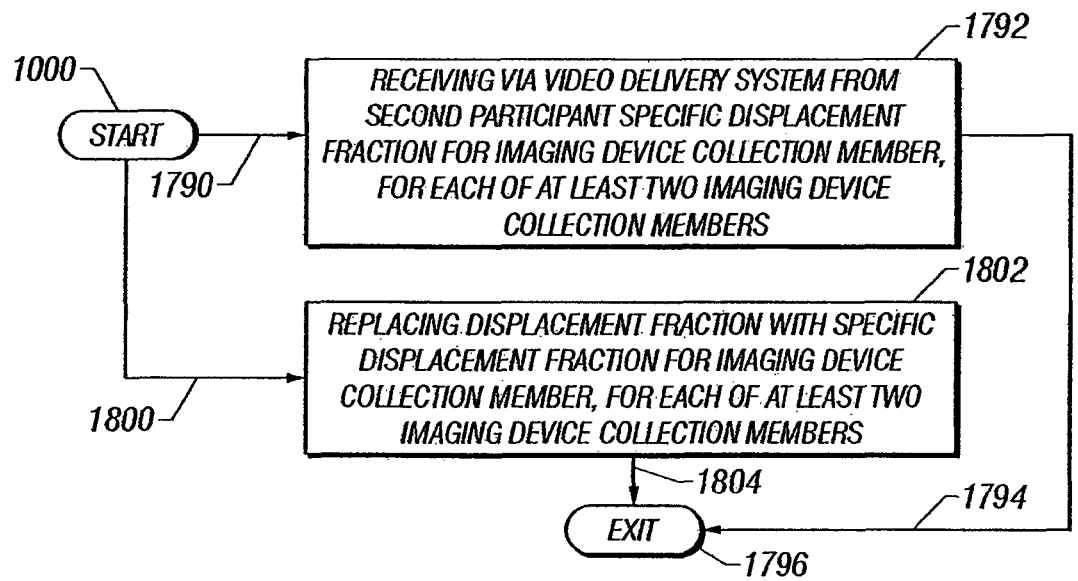
FIG. 13A depicts a detail flowchart of operational method and/or program system 1000 of FIGS. 1B and 3 for generating the composite image.
Figure 13B:
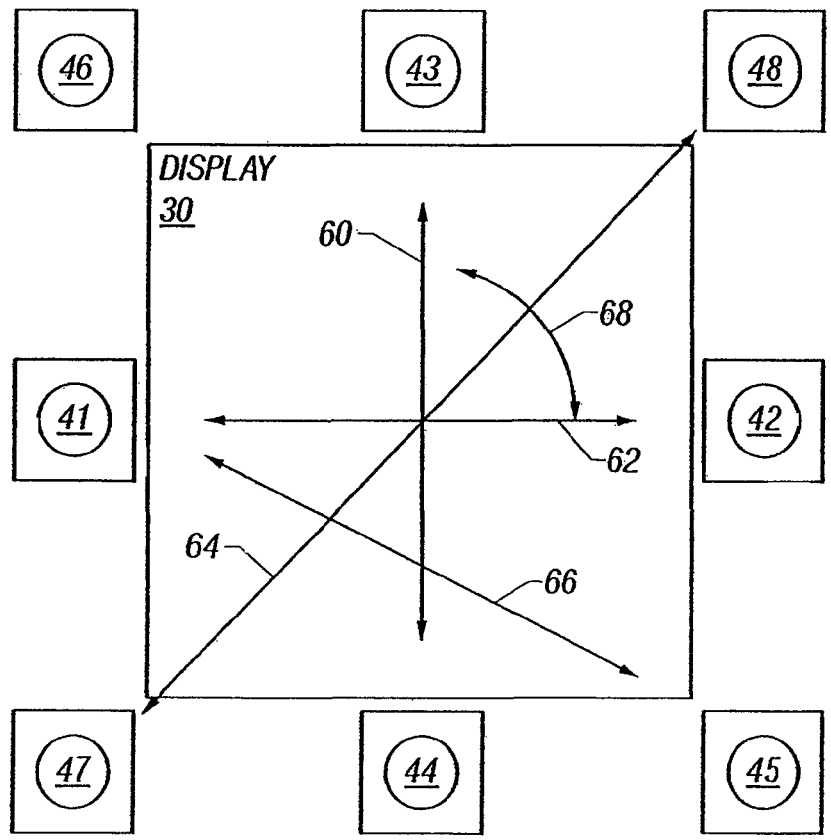
FIG. 13B depicts various imaging device collection member placements in potential relationship with display 30.

Note that the definition of first dimension and second dimension as used herein is discussed with respect to FIG. 13B.

The pixels may use, for example, any of the known encoding schemes for designating at least chrominance and luminance, including but not limited to, YUV, RGB, and the various CIE derived pixel coding schemes such as described in the background of the invention. Note that some but not all embodiments of the invention may require conversion between two or more encoding schemes.

Conversion between these coding schemes may be performed, for example, by any of the following mechanisms: table look up, numeric calculation and/or compiled logic structures further including but not limited to finite state machines, logic equations, and truth tables. Note that a table look up of a 24 bit pixel value input generating a 24 bit pixel value output requires 48 megabytes of memory.

Figure 1B:
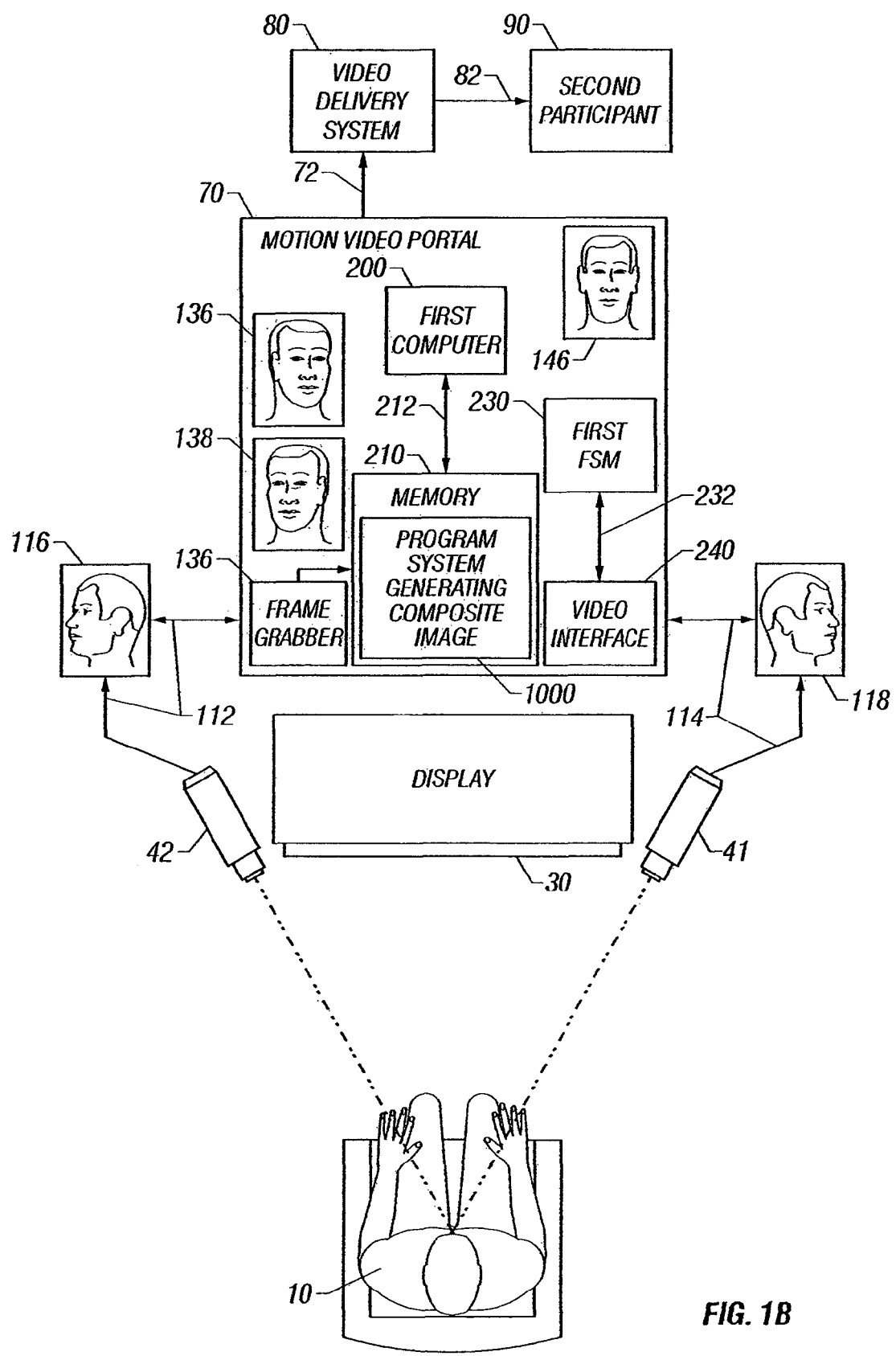
FIG. 1B shows a simplified block diagram of an alternative embodiment of the invention to FIG. 1A, with motion video portal 70 including first computer 200 with a program system 1000 at least in part generating composite image 146.

FIG. 1B shows a simplified block diagram of an alternative embodiment of the invention to FIG. 1A, with motion video portal 70 including first computer 200 with a program system 1000 at least in part generating composite image 146.

Program system 1000 is comprised of program steps residing in memory 210 accessibly coupled 212 to first computer 200.

Note that the invention includes an apparatus receiving the image collection 136 and 138 that may be stored in a memory, such as memory 210. The invention may further include various means for obtaining at least one of images 136 and 138

Note that means 110 for obtaining the digital version from at least one of the imaging device collection members may include any of the following:

A frame grabbing circuit 220 coupled 112 to imaging device collection member 42 for obtaining the image 116 from the imaging device as the image member in the synchronized image collection 118 and 116.

Video interface 240 coupling 114 imaging device collection member 41 to motion video portal 70 for obtaining a digital version of image 118 from imaging device collection member 41.

Obtaining a digital version of an image may also include the step of performing a rectifying transformation.

Note that it is preferred with today's technology that a consistent interface be provided for at least pairs of video imaging devices. It is contemplated that one of the two alternatives discussed in FIG. 1B would be used for at least pairs of video imaging devices.

The motion video portal 70 may further include any of the following: A first finite state machine 230 receiving digital version of image 118 from imaging device collection member 41 by operating 232 video interface 240. A first computer 200 coupled (not shown) with video interface 240 and accessibly coupled 212 to a first memory 210 and controlled by first program system 1000 comprised of at least one program step residing in the first memory 210.

Figure 2:
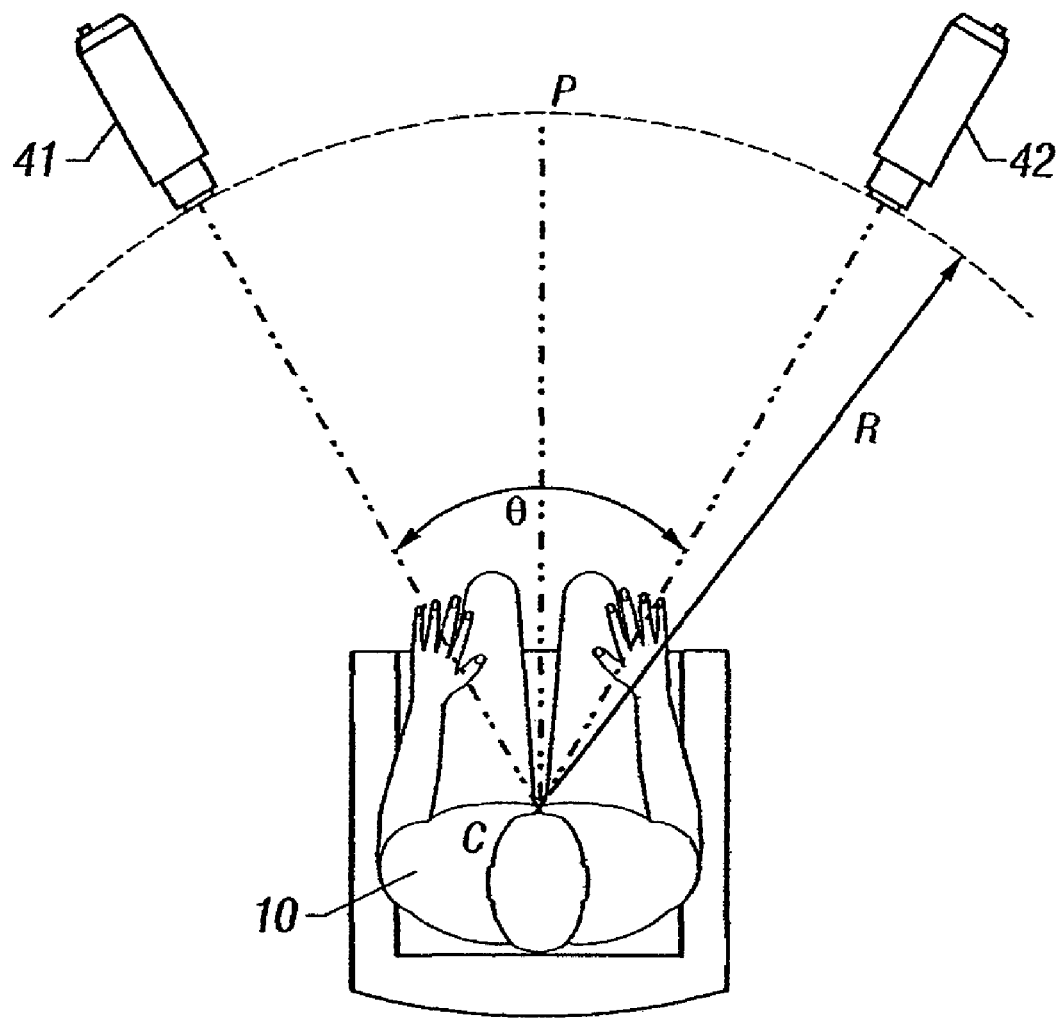
FIG. 2 shows a diagram of the preferred positioning of imaging devices 41 and 42 relative to local participant 10 as found in FIGS. 1A and 1B.

FIG. 2 is a diagram showing the preferred positioning of imaging devices 41 and 42 relative to local participant 10, as found in FIGS. 1A and 1B.

Imaging devices 41 and 42 are positioned at a common radial displacement R from the point of intersection C of the video camera field of view centerlines. The angular separation of the imaging devices, θ, is preferably the smallest allowable separation given the size of video display 30 (not shown) and the housing size of imaging devices 41 and 42.

Imaging devices 41 and 42, as well as intersection point C of the centerlines, lie approximately in a horizontal plane. Local participant 10 is preferably positioned such that his facial features are approximately located at C.

Means 100 receives the video signals from imaging devices 41 and 42, respectively, and from these video signals, creates an image of local participant 10 as viewed from a point P along the arc common arc A about the point C.

To maximize compatibility with existing video delivery equipment, means 100 may receive video input from the imaging devices and provide video output to the video delivery system in any one of a variety of video formats via a variety of transmission protocols. These video formats include but are not limited to analog formats and digital formats. The digital formats may include but are not limited to any of bitmap, grayscale, RGB, DV, YUV, and HDTV. The analog formats may include, but are not limited to, any of RS170, RS343, NTSC, PAL, SECAM, and HDTV.

As used herein, the term digital refers to any communications protocol or format based upon ordered collections of digits. Each digit is preferably a member of a single digit value collection containing finitely many digit values. In today's technology, the preferred digital value collection has two members, usually denoted as '0' and '1'.

Digital formats are particularly convenient because they allow for simple conversion of image data into a form easily manipulated by the image processing algorithm. If a digital format is selected, a transfer protocol, such as USB or IEEE 1394, may be employed. The particular format of the video output signal is typically selected to match the format of an existing video camera within the local participant's video delivery setup, thereby ensuring compatibility with the existing video delivery system 20.

With the invention configured as described above, local participant 10 positions himself or herself relative to local display 30 and imaging devices 41 and 42 approximately as shown in FIG. 2.

Local participant 10 may check his positioning relative to imaging devices 41 and 42 by previewing a composite image on local display 30. Local participant 10 may then initiate a video delivery session or join an existing video delivery session as provided by video delivery system 80. After the videoconference, local participant 10 closes the video delivery session as provided by video delivery system 80.

Prior to beginning the image processing operation, a calibration operation is preferably performed to obtain information describing the positioning and optical properties of the two imaging devices. The calibration process may be performed upon assembly of the teleconferencing apparatus if the video camera setup is a permanent fixture, or may be performed each time a change is made to the physical geometry or optical settings of the imaging devices.

Figure 3A:
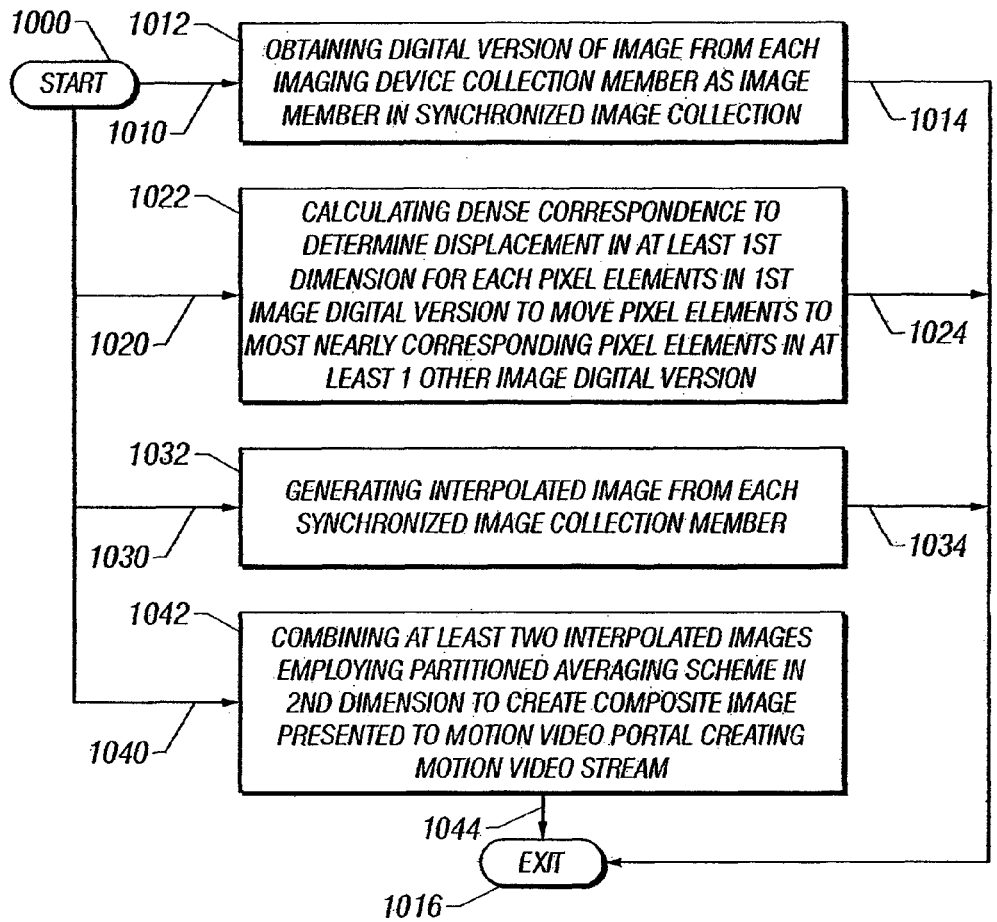
FIG. 3A depicts a detail flowchart of first program system 1000 of FIG. 1B implementing a method of conveying eye contact of a local participant presented to at least one second participant in a video delivery session as a motion video stream based upon observations by an imaging device collection.

FIG. 3A depicts a detail flowchart of first program system 1000 of FIG. 1B implementing a method of conveying eye contact of a local participant presented to at least one second participant in a video delivery session as a motion video stream based upon observations by an imaging device collection.

Arrow 1010 directs the flow of execution from starting operation 1000 to operation 1012. Operation 1012 performs obtaining a digital version of the image from each of the members of the imaging device collection as the image member in the synchronized image collection. Arrow 1014 directs execution from operation 1012 to operation 1016. Operation 1016 terminates the operations of this flowchart.

Certain embodiments of the invention include the following operations without operation 1012.

Arrow 1020 directs the flow of execution from starting operation 1000 to operation 1022. Operation 1022 performs calculating at least one dense correspondence to determine a displacement in at least a first dimension for each of the pixels in the first image digital version that would move each of the pixels to a most nearly corresponding pixel in the image digital version of at least one other member of the imaging device collection. Arrow 1024 directs execution from operation 1022 to operation 1016. Operation 1016 terminates the operations of this flowchart.

Arrow 1030 directs the flow of execution from starting operation 1000 to operation 1032. Operation 1032 performs generating an interpolated image for at least two of the imaging device collection members from the at least one dense correspondence of the at least two images. Arrow 1034 directs execution from operation 1032 to operation 1016. Operation 1016 terminates the operations of this flowchart.

Each of the interpolated images is comprised of a two-dimensional array of pixels of approximately the same size and shape.

Arrow 1040 directs the flow of execution from starting operation 1000 to operation 1042. Operation 1042 performs combining at least two of the interpolated images employing, for example, a partitioned or other averaging scheme in a second dimension to create the composite image presented to a motion video portal creating the motion video stream. Arrow 1044 directs execution from operation 1042 to operation 1016. Operation 1016 terminates the operations of this flowchart.

Note that in various embodiments of the invention none, some or all of these steps may be found as program steps residing in first memory 210 accessibly coupled 212 to at least one computer 210 contained within motion video portal 70.

Note that means 100, 110, 120, 130, and 140 of FIG. 1A may each include at least one finite state machine and/or at least one computer. Each computer is accessibly coupled to a memory and controlled by a program system made up of program steps implementing the method of operation 1000 and individual program steps 1012, 1022, 1032, and 1042, respectively, as shown in FIG. 3A.

Note that multiple computers may access a shared memory accessibly coupled to each of them.

Figure 3B:
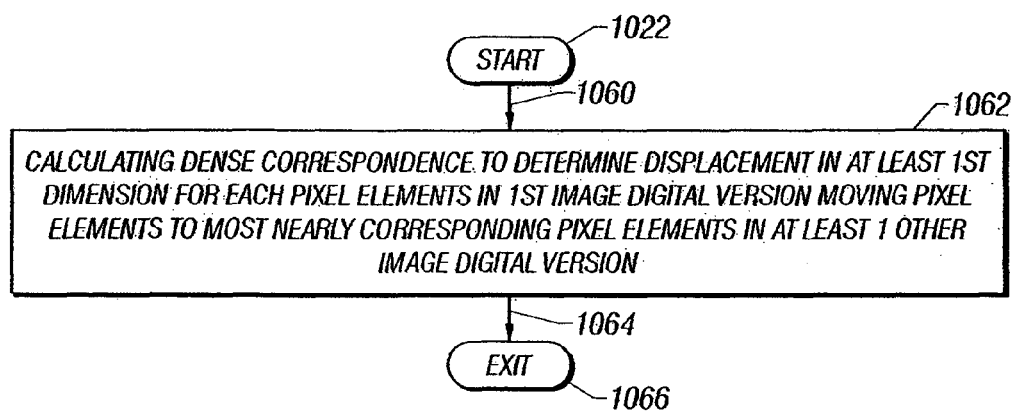
FIG. 3B depicts a detail flowchart of operation 1022 of FIG. 3A for calculating the dense correspondence.

FIG. 3B depicts a detail flowchart of operation 1022 of FIG. 3A for calculating the dense correspondence.

Arrow 1060 directs the flow of execution from starting operation 1022 to operation 1062. Operation 1062 performs calculating a dense correspondence to determine a displacement in at least a first dimension for each of the pixels in the first image digital version which would move each of the pixels to a most nearly corresponding pixel in the image digital versions of at least one other member of the imaging device collection. Arrow 1064 directs execution from operation 1062 to operation 1066. Operation 1066 terminates the operations of this flowchart.

Figure 4A:
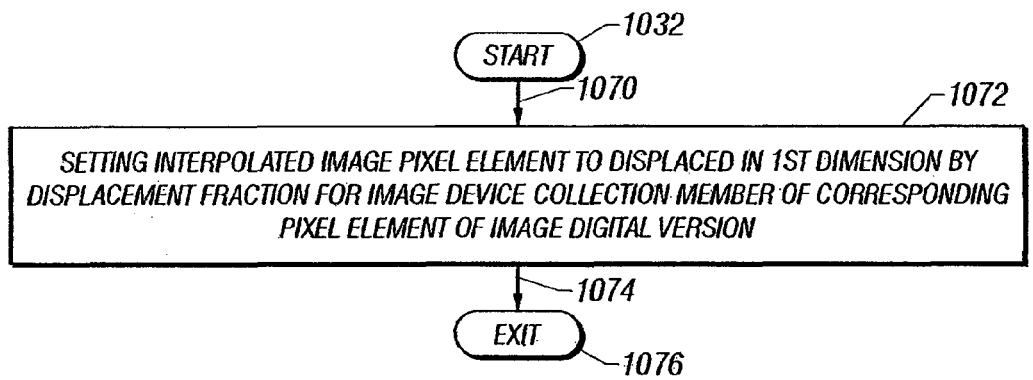
FIG. 4A depicts a detail flowchart of operation 1032 of FIG. 3 for generating the interpolated image, for each of the pixels of the interpolated image.

FIG. 4A depicts a detail flowchart of operation 1032 of FIG. 3 for generating the interpolated image, for each of the pixels of the interpolated image.

Arrow 1070 directs the flow of execution from starting operation 1032 to operation 1072. Operation 1072 sets the interpolated image pixel to the corresponding pixel of the image digital version where the interpolated image pixel displaced by a partial displacement in at least a first dimension for the image device collection member. Arrow 1074 directs execution from operation 1072 to operation 1076. Operation 1076 terminates the operations of this flowchart.

Figure 4B:
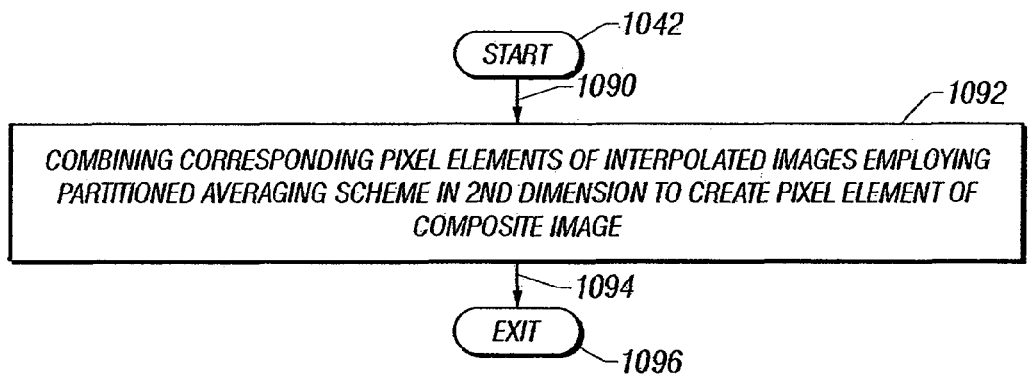
FIG. 4B depicts a detail flowchart of operation 1042 of FIG. 3 for combining the interpolated images is further comprised, for each of the pixels of the composite image.

FIG. 4B depicts a detail flowchart of operation 1042 of FIG. 3 for generating each of the pixels of the composite image by combining the interpolated images.

Arrow 1090 directs the flow of execution from starting operation 1042 to operation 1092. Operation 1092 performs combining corresponding pixels of each of the interpolated images employing the averaging scheme partitioned along a second dimension to create the pixel of the composite image. Arrow 1094 directs execution from operation 1092 to operation 1096. Operation 1096 terminates the operations of this flowchart.

Note that the sum of the partial displacements of the image device collection members is approximately equal to the displacement. In certain embodiments of the invention, the partial displacements must belong to a limited collection of incremental values, often a range of integers. The partial displacements may then sum to an incremental value close to the displacement. Suppose the displacement is '3' pixels, with the first and second partial placements may each be '1'. Their sum, as '2', is approximately equal to '3'.

Various embodiments of the invention may alternatively include displacement fractions exactly summing to the displacement. This can be achieved, at least in part, by the use of partial displacements including more than just integers.

Figure 4C:
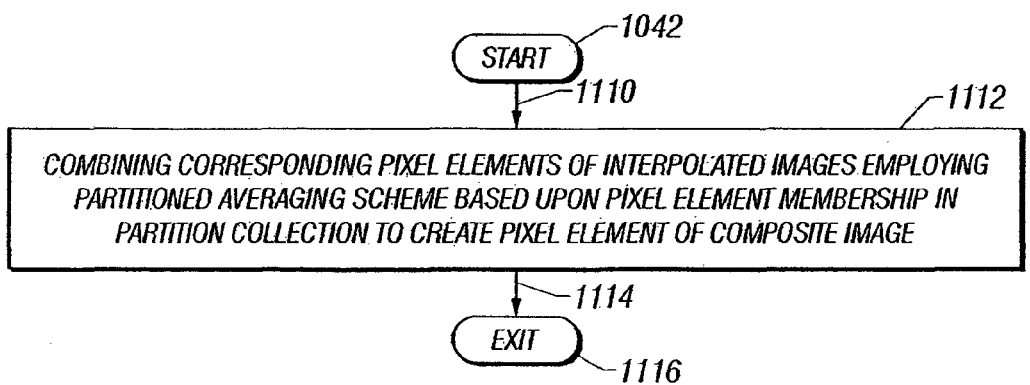
FIG. 4C depicts a detail flowchart of operation 1042 of FIG. 3 for combining corresponding pixels.

It is preferred that each of the pixels of any of the images are partially ordered in the one dimension by membership in exactly one member of a partition collection. FIG. 4C depicts a detail flowchart of operation 1042 of FIG. 3 for combining corresponding pixels.

Arrow 1110 directs the flow of execution from starting operation 1042 to operation 1112. Operation 1112 performs combining corresponding pixels of the interpolated images employing the partitioned averaging scheme based upon the pixel membership in a partition collection to create the pixel of the composite image. Arrow 1114 directs execution from operation 1112 to operation 1116. Operation 1116 terminates the operations of this flowchart.

Figure 5A:
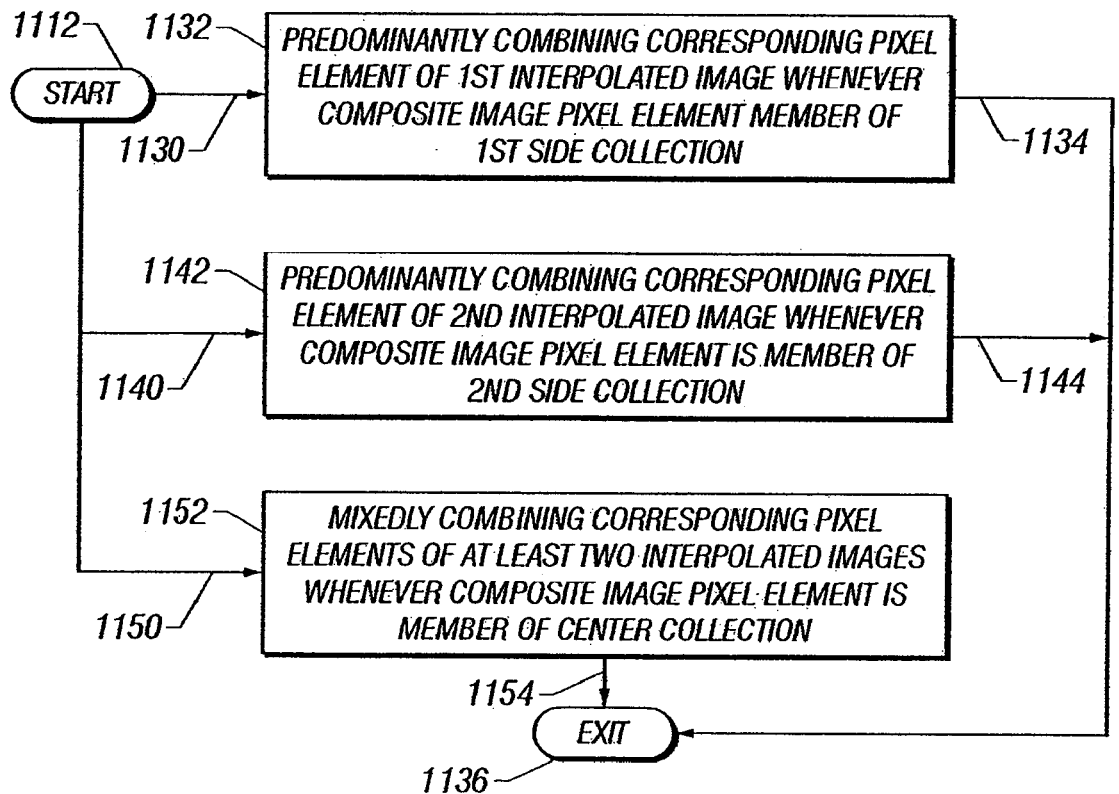
FIG. 5A depicts a detail flowchart of operation 1112 of FIG. 4C for combining corresponding pixels.

The partition collection may be comprised of a first side collection of the pixels, a center collection of pixels, and a second side collection of pixels. The center collection is between the first side collection and the second side collection in the second dimension FIG. 5A depicts a detail flowchart of operation 1112 of FIG. 4C for combining corresponding pixels.

Arrow 1130 directs the flow of execution from starting operation 1112 to operation 1132. Operation 1132 performs predominantly combining the corresponding pixel of the first interpolated image whenever the composite image pixel is a member of the first side collection. Arrow 1134 directs execution from operation 1132 to operation 1136. Operation 1136 terminates the operations of this flowchart.

Arrow 1140 directs the flow of execution from starting operation 1112 to operation 1142. Operation 1142 performs predominantly combining the corresponding pixel of the second interpolated image whenever the composite image pixel is a member of the second side collection. Arrow 1144 directs execution from operation 1142 to operation 1136. Operation 1136 terminates the operations of this flowchart.

Arrow 1150 directs the flow of execution from starting operation 1112 to operation 1152. Operation 1152 performs mixedly combining the corresponding pixels of the at least two interpolated images whenever the composite image pixel is a member of the center collection. Arrow 1154 directs execution from operation 1152 to operation 1136. Operation 1136 terminates the operations of this flowchart.

Figure 5B:
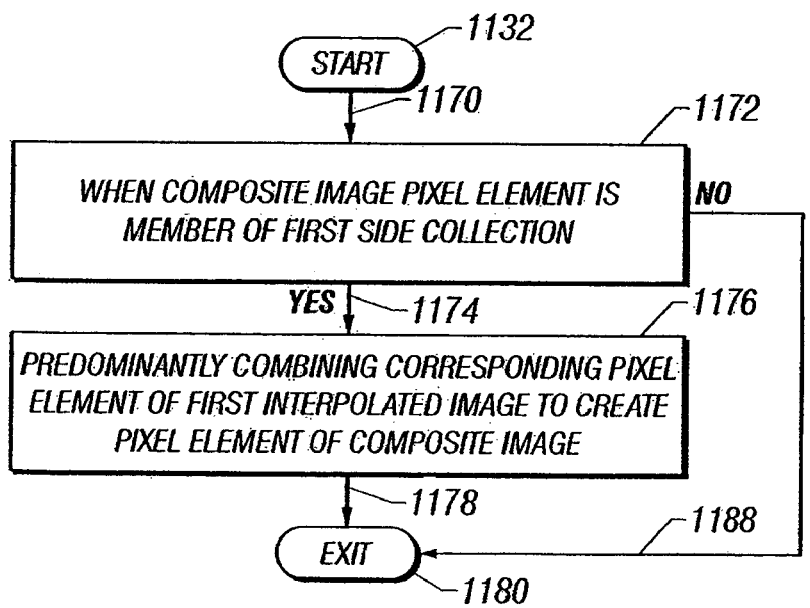
FIG. 5B depicts a detail flowchart of operation 1132 of FIG. 5A for predominantly combining the corresponding pixel of the first interpolated image whenever the composite image pixel is a member of the first side collection.

FIG. 5B depicts a detail flowchart of operation 1132 of FIG. 5A for predominantly combining the corresponding pixel of the first interpolated image whenever the composite image pixel is a member of the first side collection.

Arrow 1170 directs the flow of execution from starting operation 1132 to operation 1172. Operation 1172 determines when the composite image pixel is a member of the first side collection. Arrow 1174 directs execution from operation 1172 to operation 1176 when the determination is 'Yes'. Arrow 1188 directs execution to 1180 when the determination is 'No'.

Operation 1176 performs predominantly combining the corresponding pixel of the first interpolated image to create the composite image pixel. Arrow 1178 directs execution from operation 1176 to operation 1180. Operation 1180 terminates the operations of this flowchart.

Figure 6A:
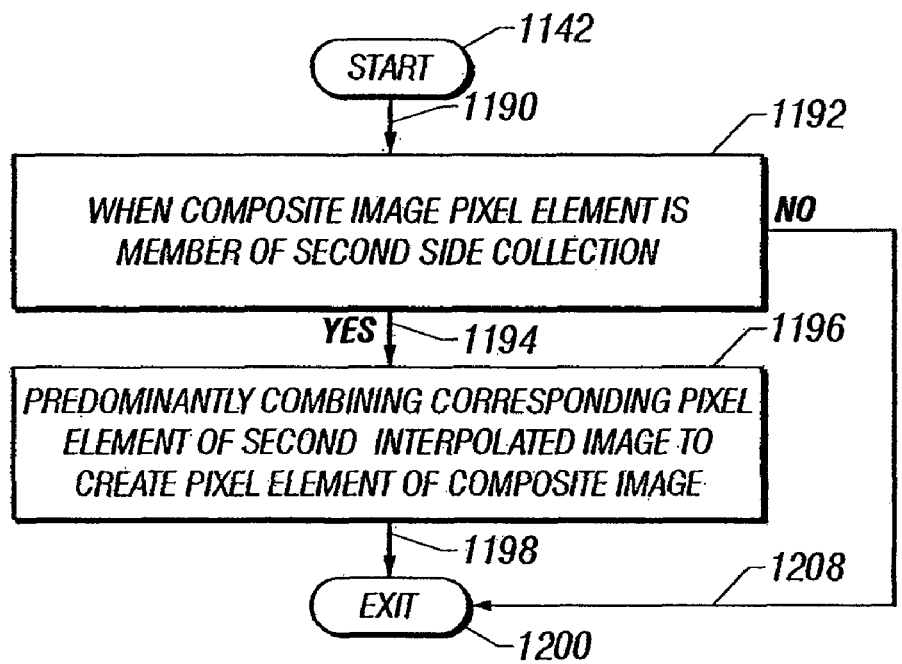
FIG. 6A depicts a detail flowchart of operation 1142 of FIG. 5A for predominantly combining the corresponding pixel of the second interpolated image whenever the composite image pixel is a member of the second side collection.

FIG. 6A depicts a detail flowchart of operation 1142 of FIG. 5A for predominantly combining the corresponding pixel of the second interpolated image whenever the composite image pixel is a member of the second side collection.

Arrow 1190 directs the flow of execution from starting operation 1142 to operation 1192. Operation 1192 determines when the composite image pixel is a member of the second side collection. Arrow 1194 directs execution from operation 1192 to operation 1196 when the determination is 'Yes'. Arrow 1208 directs execution to 1200 when the determination is 'No'.

Operation 1196 performs predominantly combining the corresponding pixel of the second interpolated image to create the composite image pixel. Arrow 1198 directs execution from operation 1196 to operation 1200. Operation 1200 terminates the operations of this flowchart.

Figure 6B:
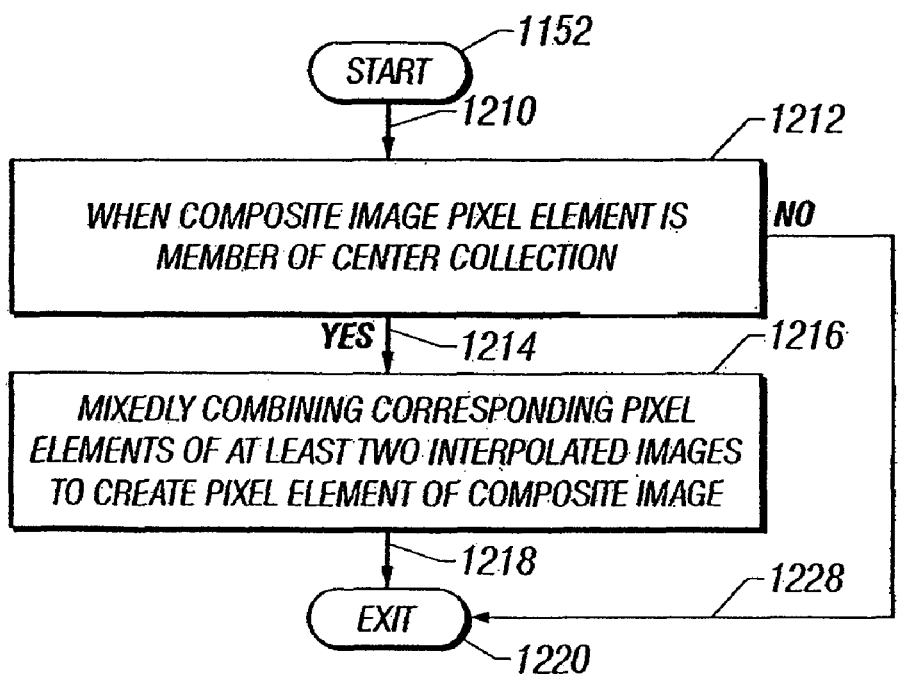
FIG. 6B depicts a detail flowchart of operation 1152 of FIG. 5A for mixedly combining the corresponding pixels of the at least two interpolated images whenever the composite image pixel is a member of the center collection.

FIG. 6B depicts a detail flowchart of operation 1152 of FIG. 5A for mixedly combining the corresponding pixels of the at least two interpolated images whenever the composite image pixel is a member of the center collection.

Arrow 1210 directs the flow of execution from starting operation 1152 to operation 1212. Operation 1212 determines when the composite image pixel is a member of the center collection. Arrow 1214 directs execution from operation 1212 to operation 1216 when the determination is 'Yes'. Arrow 1228 directs execution to 1220 when the determination is 'No'.

Operation 1216 performs mixedly combining the corresponding pixels of the at least two interpolated images to create the composite image pixel. Arrow 1218 directs execution from operation 1216 to operation 1220. Operation 1220 terminates the operations of this flowchart.

Figure 7:
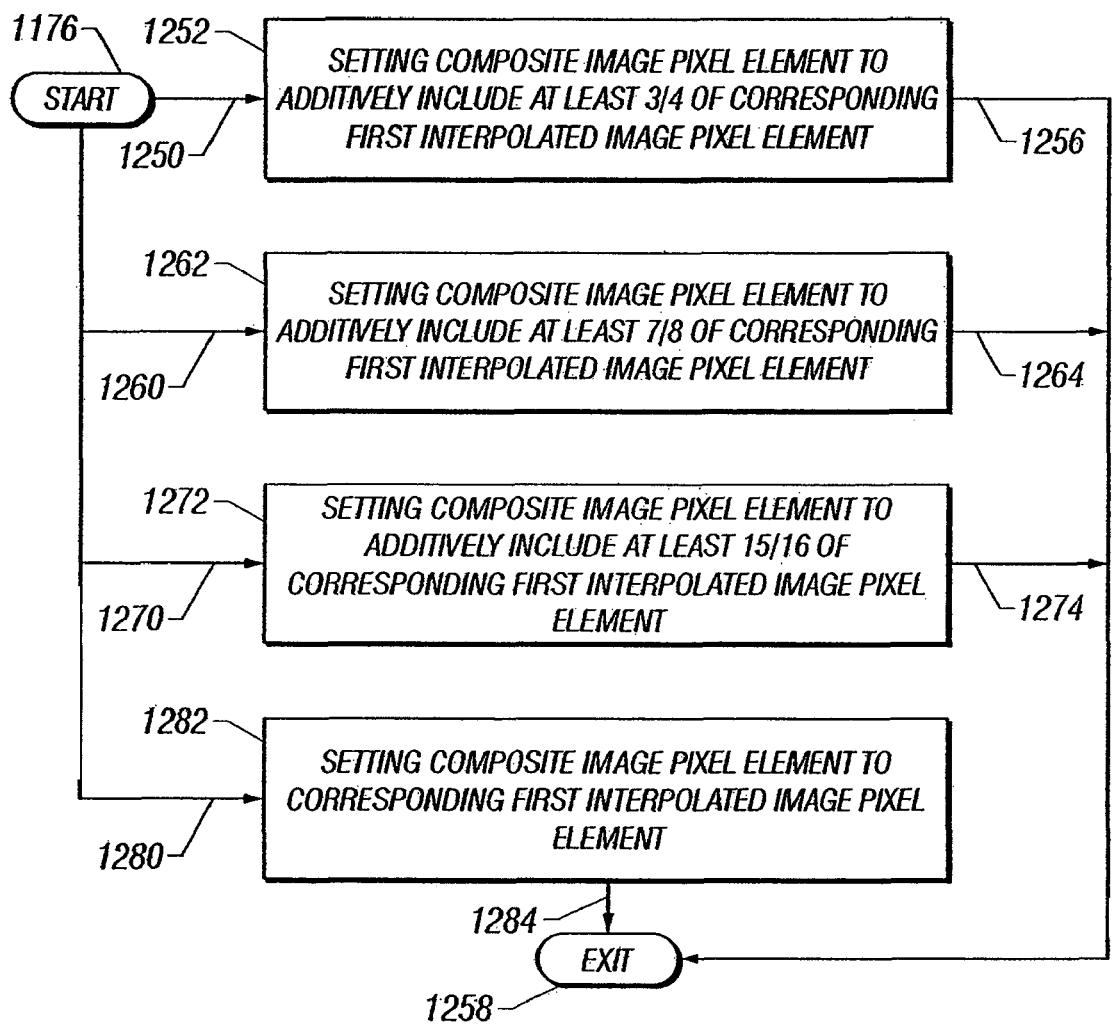
FIG. 7 depicts a detail flowchart of operation 1176 of FIG. 5B for predominantly combining the corresponding first interpolated image pixel.

FIG. 7 depicts a detail flowchart of operation 1176 of FIG. 5B for predominantly combining the corresponding first interpolated image pixel.

Arrow 1250 directs the flow of execution from starting operation 1176 to operation 1252. Operation 1252 performs setting the composite image pixel to include, for example, at least ½ of the corresponding first interpolated image pixel. Arrow 1254 directs execution from operation 1252 to operation 1256. Operation 1256 terminates the operations of this flowchart.

Arrow 1260 directs the flow of execution from starting operation 1176 to operation 1262. Operation 1262 performs setting the composite image pixel to include, for example, at least ⅞ of the corresponding first interpolated image pixel. Arrow 1264 directs execution from operation 1262 to operation 1256. Operation 1256 terminates the operations of this flowchart.

Arrow 1270 directs the flow of execution from starting operation 1176 to operation 1272. Operation 1272 performs setting the composite image pixel to include, for example, at least ¹⁵⁄₁₆ of the corresponding first interpolated image pixel. Arrow 1274 directs execution from operation 1272 to operation 1256. Operation 1256 terminates the operations of this flowchart.

Arrow 1280 directs the flow of execution from starting operation 1176 to operation 1282. Operation 1282 performs setting the composite image pixel to the corresponding first interpolated image pixel. Arrow 1284 directs execution from operation 1282 to operation 1256. Operation 1256 terminates the operations of this flowchart.

Figure 8:
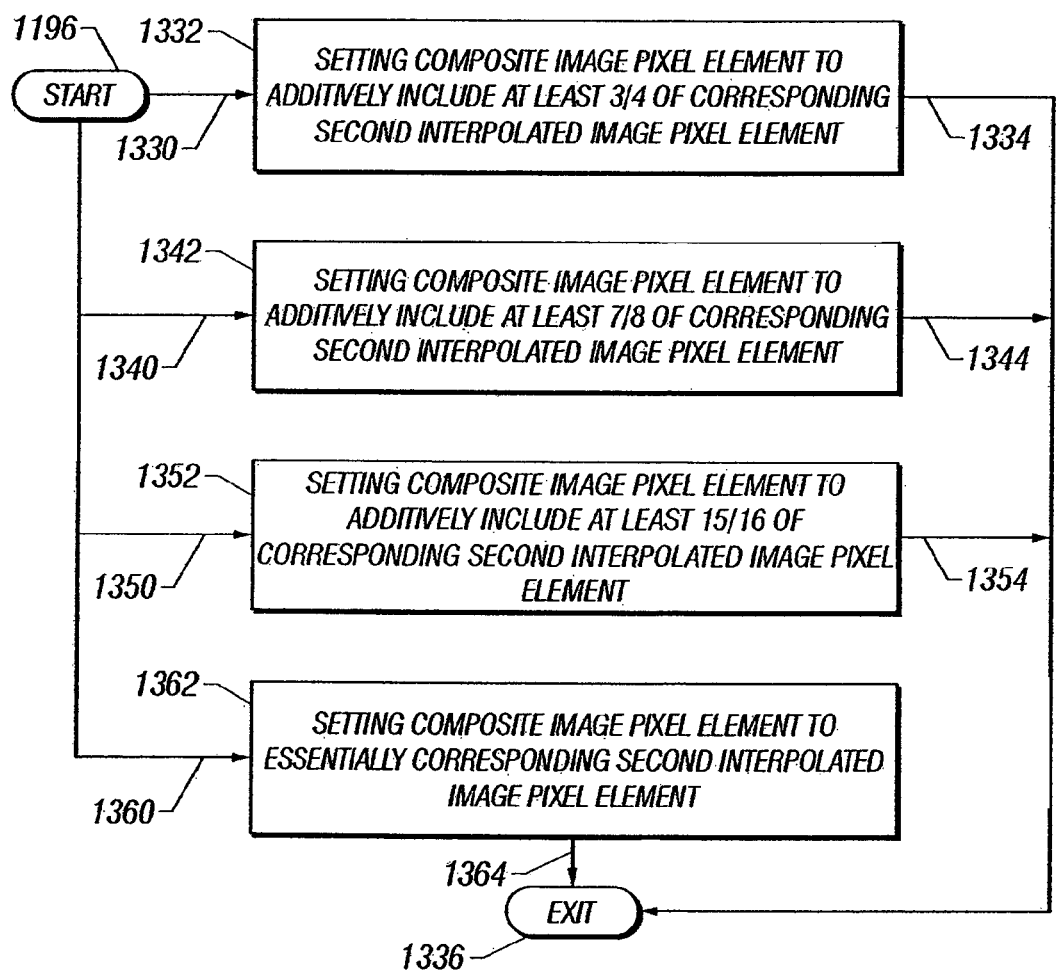
FIG. 8 depicts a detail flowchart of operation 1196 of FIG. 6A for predominantly combining the corresponding second interpolated image pixel.

FIG. 8 depicts a detail flowchart of operation 1196 of FIG. 6A for predominantly combining the corresponding second interpolated image pixel.

Arrow 1330 directs the flow of execution from starting operation 1196 to operation 1332. Operation 1332 performs setting the composite image pixel to include, for example, at least ¾ of the corresponding second interpolated image pixel. Arrow 1334 directs execution from operation 1332 to operation 1336. Operation 1336 terminates the operations of this flowchart.

Arrow 1340 directs the flow of execution from starting operation 1196 to operation 1342. Operation 1342 performs setting the composite image pixel to include, for example, at least ⅞ of the corresponding second interpolated image pixel. Arrow 1344 directs execution from operation 1342 to operation 1336. Operation 1336 terminates the operations of this flowchart.

Arrow 1350 directs the flow of execution from starting operation 1196 to operation 1352. Operation 1352 performs setting the composite image pixel to include, for example, at least ¹⁵⁄₁₆ of the corresponding second interpolated image pixel. Arrow 1354 directs execution from operation 1352 to operation 1336. Operation 1336 terminates the operations of this flowchart.

Arrow 1360 directs the flow of execution from starting operation 1196 to operation 1362. Operation 1362 performs setting the composite image pixel to essentially the corresponding second interpolated image pixel. Arrow 1364 directs execution from operation 1362 to operation 1336. Operation 1336 terminates the operations of this flowchart.

Figure 9A:
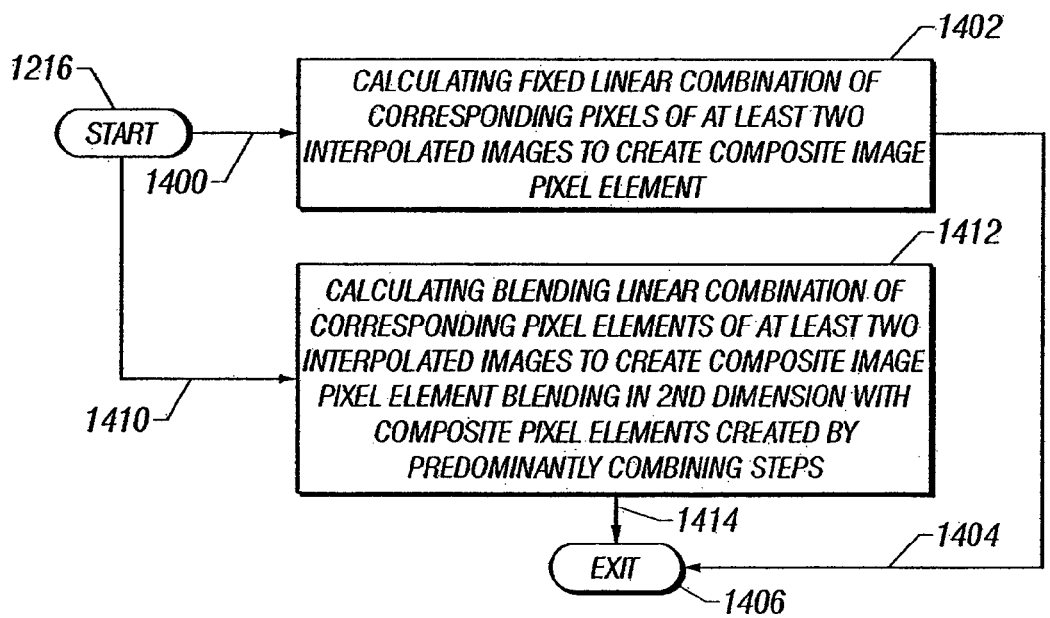
FIG. 9A depicts a detail flowchart of operation 1216 of FIG. 6B for mixedly combining the corresponding pixel of the at least two interpolated images.

FIG. 9A depicts a detail flowchart of operation 1216 of FIG. 6B for mixedly combining the corresponding pixel of the at least two interpolated images.

Arrow 1400 directs the flow of execution from starting operation 1216 to operation 1402. Operation 1402 performs calculating a fixed linear combination of the corresponding pixels of the at least two interpolated images to create the composite image pixel. Arrow 1404 directs execution from operation 1402 to operation 1406. Operation 1406 terminates the operations of this flowchart.

Arrow 1410 directs the flow of execution from starting operation 1216 to operation 1412. Operation 1412 performs calculating a blending linear combination of the corresponding pixels of the at least two interpolated images to create the composite image pixel blending in the second dimension with the composite pixels created by the predominantly combining steps. Arrow 1414 directs execution from operation 1412 to operation 1406. Operation 1406 terminates the operations of this flowchart.

Figure 9B:
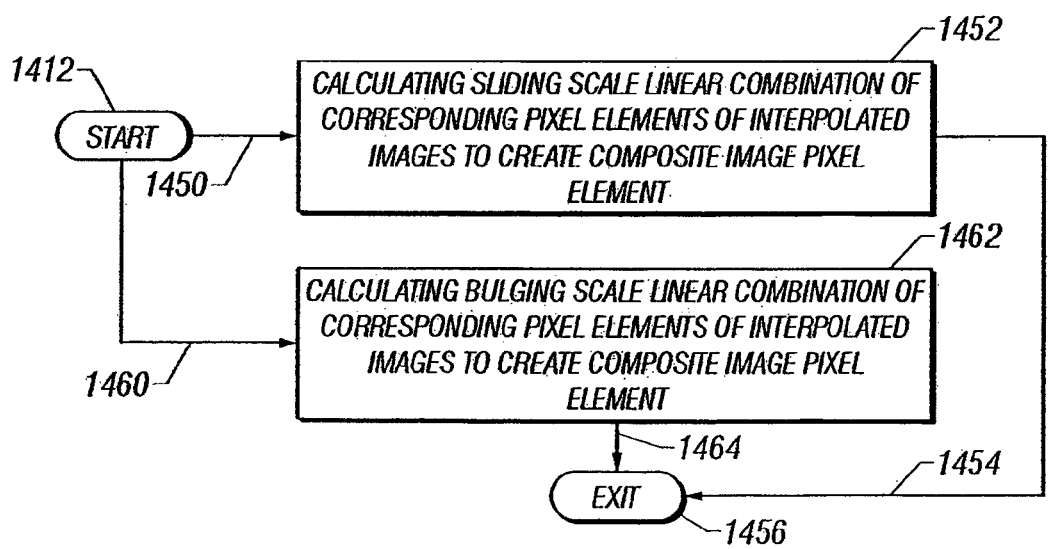
FIG. 9B depicts a detail flowchart of operation 1412 of FIG. 9A for calculating the blending linear combination.

FIG. 9B depicts a detail flowchart of operation 1412 of FIG. 9A for calculating the blending linear combination.

Arrow 1450 directs the flow of execution from starting operation 1412 to operation 1452. Operation 1452 performs calculating a sliding scale linear combination of the corresponding pixels of the at least two interpolated images to create the composite image pixel blending in the second dimension with the composite pixels created by the predominantly combining steps. Arrow 1454 directs execution from operation 1452 to operation 1456. Operation 1456 terminates the operations of this flowchart.

Arrow 1460 directs the flow of execution from starting operation 1412 to operation 1462. Operation 1462 performs calculating a bulging scale linear combination of the corresponding pixels of the at least two interpolated images to create the composite image pixel blending in the second dimension with the composite pixels created by the predominantly combining steps. Arrow 1464 directs execution from operation 1462 to operation 1456. Operation 1456 terminates the operations of this flowchart.

Figure 10A:
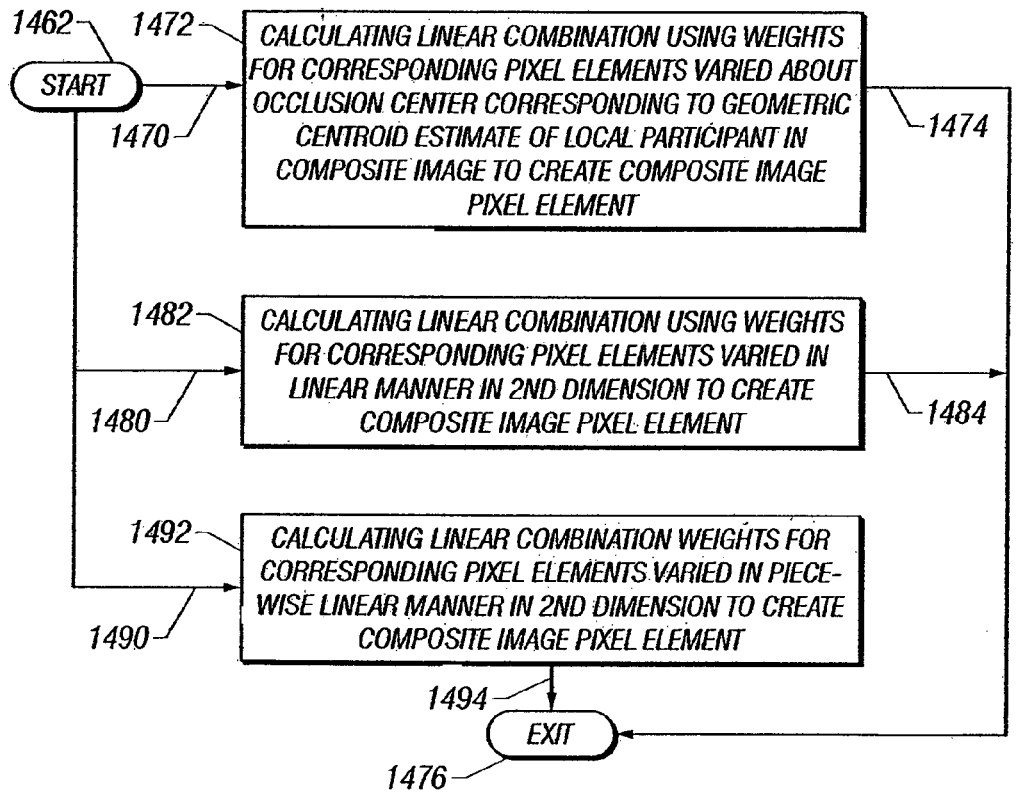
FIG. 10A depicts a detail flowchart of operation 1462 of FIG. 9B for calculating the bulging scale linear combination.

FIG. 10A depicts a detail flowchart that shows a central partitioning technique that may be used, interalia, operation 1216 of FIG. 6B for mixedly combining the corresponding pixel of the at least two interpolated images.

Arrow 1470 directs the flow of execution from starting operation to operation 1472. Operation 1472 performs mixedly combining the corresponding pixels varied about an occlusion center corresponding to a geometric centroid estimate of the local participant in the composite image to create the composite image pixelpixel. Arrow 1474 directs execution from operation 1472 to operation 1476. Operation 1476 terminates the operations of this flowchart.

Arrow 1480 directs the flow of execution from starting operation 1216 to operation 1482. Operation 1482 performs mixedly combining the corresponding pixels varied in a linear manner in the second dimension to create the composite image pixelpixel. Arrow 1484 directs execution from operation 1482 to operation 1476. Operation 1476 terminates the operations of this flowchart.

Arrow 1490 directs the flow of execution from starting operation 1216 to operation 1492. Operation 1492 performs mixedly combining the corresponding pixels varied in a piece-wise linear manner in the second dimension to create the composite image pixelpixel. Arrow 1494 directs execution from operation 1492 to operation 1476. Operation 1476 terminates the operations of this flowchart.

Figure 10B:
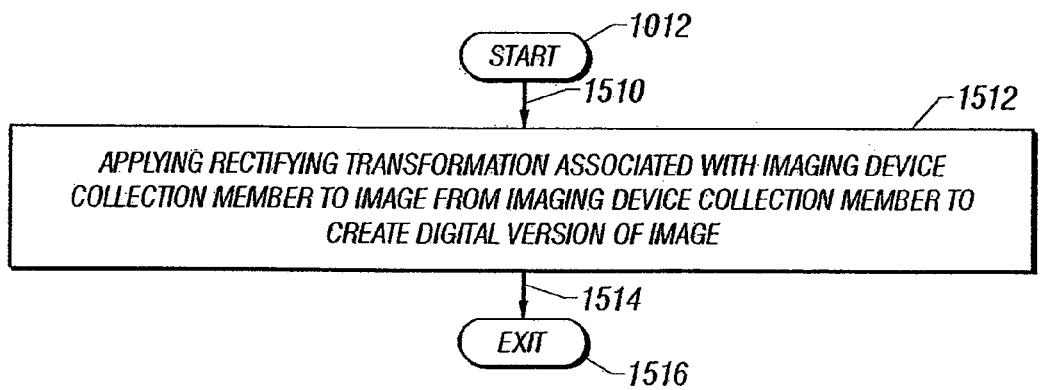
FIG. 10B depicts a detail flowchart of operation 1012 of FIG. 3 for obtaining the digital version of the image from imaging device collection member as the image member in the synchronized image collection, for each of the imaging device collection members.

FIG. 10B depicts a detail flowchart of operation 1012 of FIG. 3A for obtaining the digital version of the image from imaging device collection member as the image member in the synchronized image collection, for each of the imaging device collection members.

Arrow 1510 directs the flow of execution from starting operation 1012 to operation 1512. Operation 1512 performs applying a rectifying transformation associated with the imaging device collection member to the image from the imaging device collection member to create the digital version of the image. Arrow 1514 directs execution from operation 1512 to operation 1516. Operation 1516 terminates the operations of this flowchart.

Figure 11A:
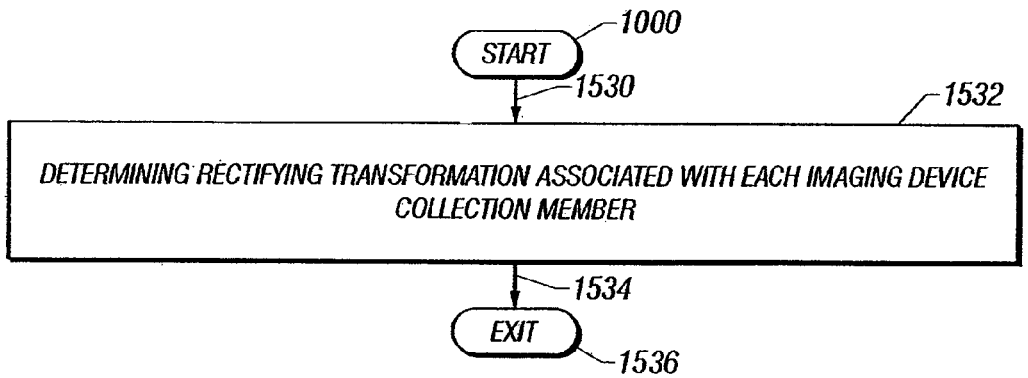
FIG. 11A depicts a detail flowchart of method of operation and program system 1000 of FIGS. 1B and 3 for generating the composite image, for at least two of the imaging device collection members.

FIG. 11A depicts a detail flowchart of an optional step in connection with the method of operation and program system 1000 of FIGS. 1B and 3A for generating the composite image, for at least two of the imaging device collection members.

Arrow 1530 directs the flow of execution from starting operation 1000 to operation 1532. Operation 1532 performs determining the rectifying transformation associated with the imaging device collection member, based upon a raw image from the imaging device collection member. Arrow 1534 directs execution from operation 1532 to operation 1536. Operation 1536 terminates the operations of this flowchart.

Figure 11B:
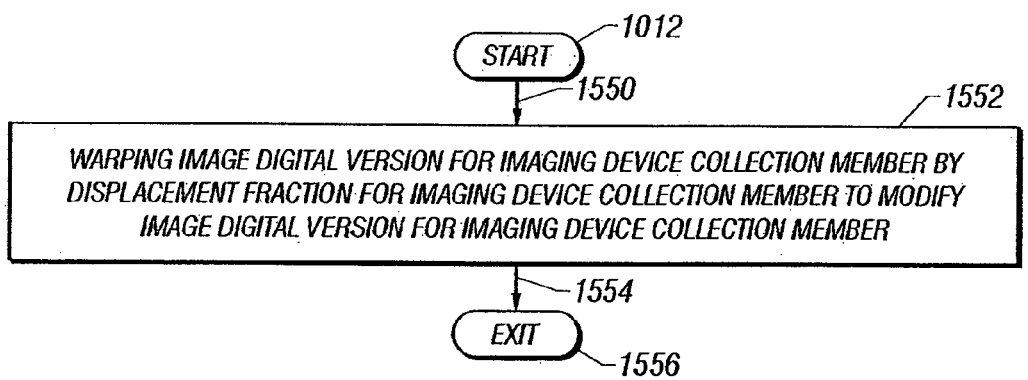
FIG. 11B depicts a detail flowchart of operation 1012 of FIGS. 1B and 3 for obtaining the digital version of the image, for each of the at least two imaging device collection members.

FIG. 11B depicts a detail flowchart of operation 1012 of FIG. 1B and 3A for obtaining the digital version of the image, for each of the at least two imaging device collection members.

Arrow 1550 directs the flow of execution from starting operation 1012 to operation is 1552. Operation 1552 performs warping the image digital version for the imaging device collection member by the partial displacement for the imaging device collection member to modify the digital version image for the imaging device collection member. Arrow 1554 directs execution from operation 1552 to operation 1556. Operation 1556 terminates the operations of this flowchart.

Further, warping the digital versions of these images has been shown in simulation experiments by the inventor to minimize the computational overhead in the dense correspondence calculation step. This advantageously decreases the computational effort required to create the composite image.

Note that certain embodiments of the invention may actively incorporate the operations of FIGS. 11A and 11B into a single image operation to achieve approximately the same results of successively performing these operations.

Figure 11C:
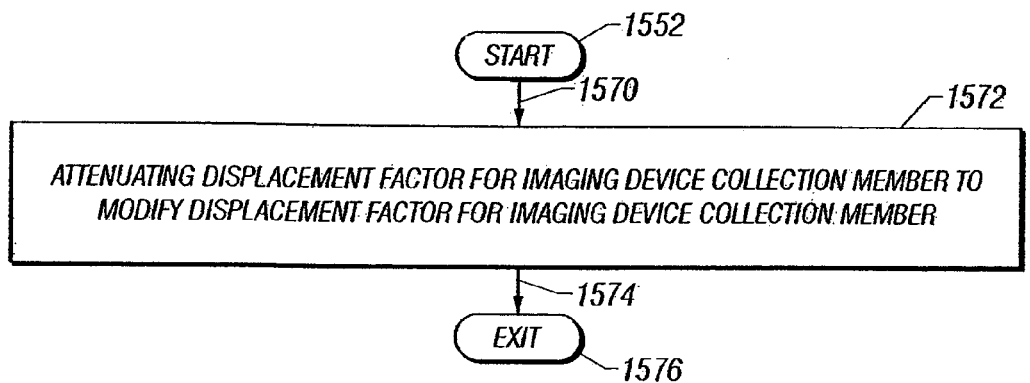
FIG. 11C depicts a detail flowchart of operation 152 of FIG. 11B for warping the image digital version.

FIG. 11C depicts a detail flowchart of operation 1552 of FIG. 11B for warping the image digital version.

Arrow 1570 directs the flow of execution from starting operation 1552 to operation 1572. Operation 1572 performs applying an attenuating factor to the partial displacement for the imaging device collection member to modify the partial displacement for the imaging device collection member. Arrow 1574 directs execution from operation 1572 to operation 1576. Operation 1576 terminates the operations of this flowchart.

Figure 12A:
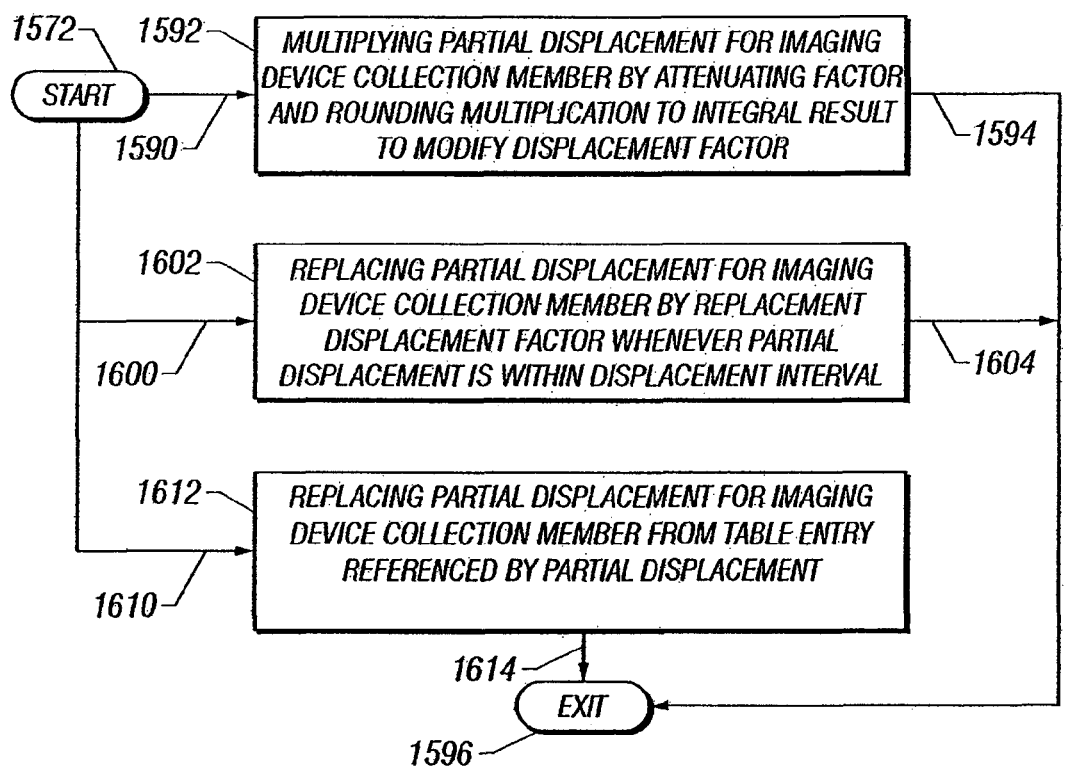
FIG. 12 depicts a detail flowchart of operation 1572 of FIG. 11C for attenuating the displacement factor for the imaging device collection member to modify the displacement factor.
FIG. 12B depicts a detail flowchart of operation 1592 of FIG. 12A for multiplying the displacement factor for the imaging device collection member comprised of an operational member of this flowchart.

FIG. 12A depicts a detail flowchart, for alternative embodiments of the invention is for operation 1572 of FIG. 11C for attenuating the partial displacement for the imaging device collection member to modify the partial displacement.

Arrow 1590 directs the flow of execution from starting operation 1572 to operation 1592. Operation 1592 performs multiplying the partial displacement for the imaging device collection member by an attenuating factor and optionally rounding the multiplication to an integral result to modify the partial displacement. Arrow 1594 directs execution from operation 1592 to operation 1596. Operation 1596 terminates the operations of this flowchart.

Arrow 1600 directs the flow of execution from starting operation 1572 to operation 1602. Operation 1602 performs replacing the partial displacement for the imaging device collection member by a replacement partial displacement whenever the partial displacement is within a displacement interval. Arrow 1604 directs execution from operation 1602 to operation 1596. Operation 1596 terminates the operations of this flowchart.

Such operations as 1602 permit replacement of the partial displacement based upon its inclusion in a range or interval of displacements. If the partial displacement corresponds to a displacement fraction between $\frac{1}{16}$ and $\frac{3}{16}$, it may be replaced by a partial displacement corresponding to a displacement fraction of $\frac{1}{8}$, for example.

Arrow 1610 directs the flow of execution from starting operation 1572 to operation 1612. Operation 1612 performs replacing the partial displacement for the imaging device collection member by a table entry referenced by the partial displacement. Arrow 1614 directs execution from operation 1612 to operation 1596. Operation 1596 terminates the operations of this flowchart.

Note, the attenuating factor may be between 0.0 and 1.1. In certain preferred embodiments of the invention, the attenuating factor is between 0.90 and 1.00.

Figure 12B:
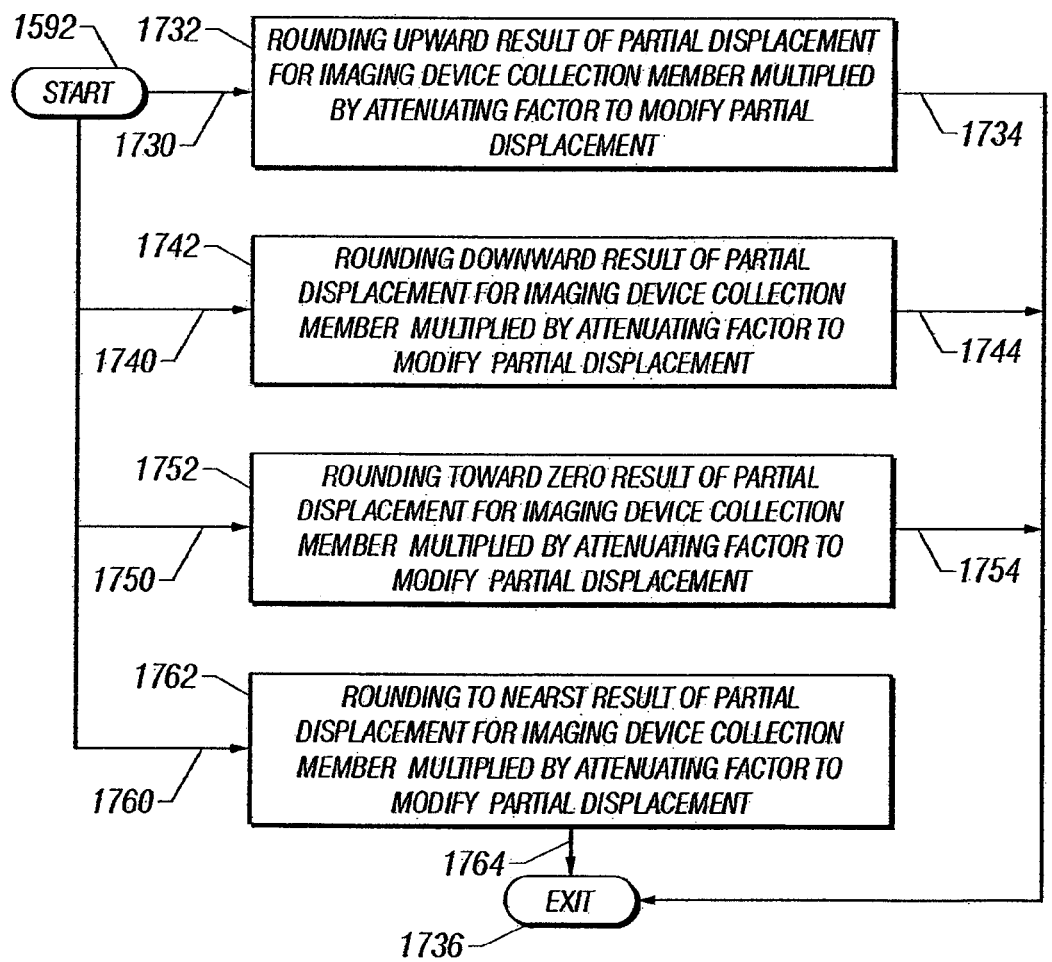

FIG. 12B depicts a detail flowchart of operation 1592 of FIG. 12A for multiplying the partial displacement for the imaging device collection member.

Arrow 1730 directs the flow of execution from starting operation 1592 to operation 1732. Operation 1732 performs rounding upward the result of the partial displacement for the imaging device collection member multiplied by the attenuating factor to modify the partial displacement. Arrow 1734 directs execution from operation 1732 to operation 1736. Operation 1736 terminates the operations of this flowchart.

Arrow 1740 directs the flow of execution from starting operation 1592 to operation 1742. Operation 1742 performs rounding downward the result of the partial displacement for the imaging device collection member multiplied by the attenuating factor to modify the partial displacement. Arrow 1744 directs execution from operation 1742 to operation 1736. Operation 1736 terminates the operations of this flowchart.

Arrow 1750 directs the flow of execution from starting operation 1592 to operation 1752. Operation 1752 performs rounding toward zero the result of the partial displacement for the imaging device collection member multiplied by the attenuating factor to modify the partial displacement. Arrow 1754 directs execution from operation 1752 to operation 1736. Operation 1736 terminates the operations of this flowchart.

Arrow 1760 directs the flow of execution from starting operation 1592 to operation 1762. Operation 1762 performs rounding to nearest the result of the partial displacement for the imaging device collection member multiplied by the attenuating factor to modify the partial displacement. Arrow 1764 directs execution from operation 1762 to operation 1736. Operation 1736 terminates the operations of this flowchart.

FIG. 13A depicts a detail flowchart of operational method and/or program system 1000 of FIGS. 1A, 1B, and 3A for generating the composite image which receives specific displacement fractions from the second participant and replaces the displacement fractions in use with the specific displacement fractions Arrow 1790 directs the flow of execution from starting operation 1000 to operation 1792. Operation 1792 performs receiving via the video delivery system from the second participant a specific displacement fraction for the imaging device collection member, for the at least two of the imaging device collection members. Arrow 1794 directs execution from operation 1792 to operation 1796. Operation 1796 terminates the operations of this flowchart.

Arrow 1800 directs the flow of execution from starting operation 1000 to operation 1802. Operation 1802 performs replacing the displacement fraction with the specific displacement fraction for the imaging device collection member, for the at least two imaging device collection members. Arrow 1804 directs execution from operation 1802 to operation 1796. Operation 1796 terminates the operations of this flowchart.

FIG. 13B depicts various potential imaging device collection member placements in relationship with display 30.

Note that at least two imaging device collection members may each include equipment containing a Charge Coupled Device (CCD) array. The equipment may include more than one CCD array per imaging device collection member. At least one of the imaging device collection members may further preferably embody at least one video camera.

At least two imaging device collection members, 41 and 42, are preferably horizontally positioned with respect to the head of local participant 10, as seen through inspection of FIGS. 1A, 2, and 13B.

At least two imaging device collection members, 43 and 44, may be vertically positioned with respect to the head of local participant 10, as seen through inspection of FIGS. 2 and 13B.

At least two imaging device collection members, 45 and 46, or alternatively 47 and 48, may be diagonally positioned with respect to the head of local participant 10, as seen through inspection of FIGS. 2 and 13B.

At least two imaging device collection members may preferably be symmetrically positioned about a local display as seen by local participant 10, as seen through inspection of FIGS. 2 and 13B. By way of example, any of the pairs 41 and 42, 43 and 44, 45 and 46, or alternatively 47 and 48 display such symmetry. Additionally, groupings of more than two imaging device collection members may exhibit symmetry. By way of example, the quadruple 41, 42, 43 and 44, as well as the quadruple 45, 46, 47 and 48 display such symmetry.

Note that as used herein, an imaging device collection may preferably include, but is not limited to, two, three and/or four members.

As used herein the first dimension and the second dimension belong to a collection comprising an essentially vertical dimension 60, an essentially horizontal dimension 62, an essentially diagonal dimension 64 and 66 as well as an essentially angular dimension 68. As used herein, these dimensions 60-66 are preferably aligned with two imaging device collection members. The essentially angular dimension 68 may preferably use the approximate center of the pixel array as the angular center. Alternatively, the essentially angular dimension may use the occlusion center corresponding to a geometric centroid estimate of the local participant in the composite image.

In certain embodiments of the invention, whenever there are exactly two imaging device collection members being used, the first dimension and second dimension may be the same.

Whenever there are an odd number of imaging device collection members in use, the second dimension may preferably be the essentially angular dimension.

By way of example, consider an embodiment of the invention using three imaging devices, 43, 45 and 47. The first dimension, for a given correspondence, is typically aligned along a line connecting the two imaging devices for which the correspondence is calculated. Only one such first dimension would be horizontal in a three camera arrangement as shown. One possibility, though, is that the first dimension is horizontal as defined by the epipolar lines of the rectified images.

Note that rather than just one center collection, as many as three center collections as well as three side collections of pixels may be preferred. Note further that while the composite image is comprised of essentially the array of pixels as discussed previously, there is also the potential of mapping individual pixels by an ordering implicit with the second dimension.

Figure 14A:
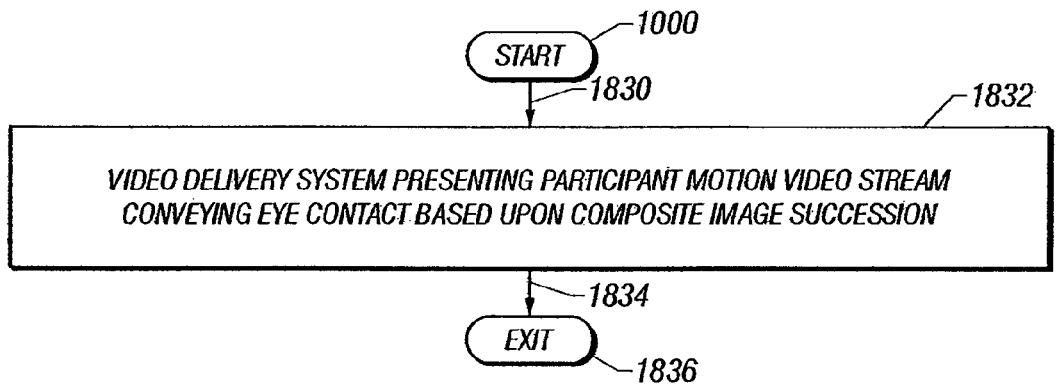
FIG. 14A depicts a detail flowchart of operational method and program system 1000 of FIGS. 1A, 1B and 3 for generating the composite image.

FIG. 14A depicts a detail flowchart of operational method and program system 1000 of FIGS. 1A, 1B and 3A for generating the composite image.

Arrow 1830 directs the flow of execution from starting operation 1000 to operation 1832. Operation 1832 performs the video delivery system presenting the local participant the motion video stream conveying eye contact based upon the composite image succession. Arrow 1834 directs execution from operation 1832 to operation 1836. Operation 1836 terminates the operations of this flowchart.

Figure 14B:
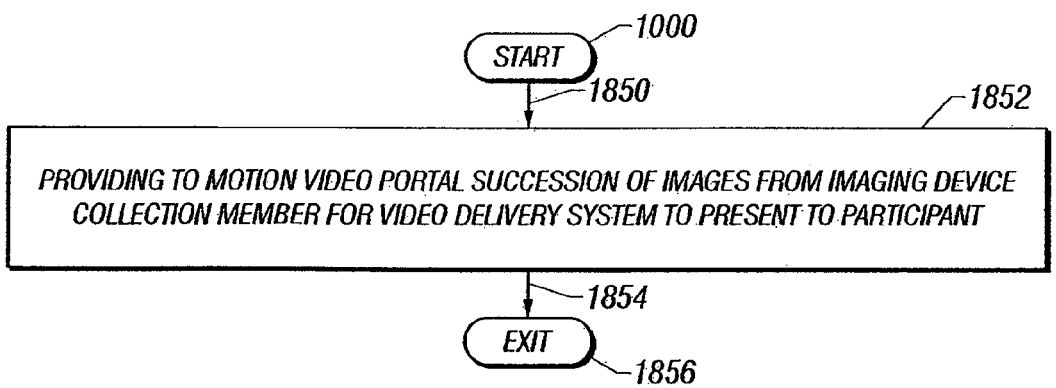
FIG. 14B depicts a detail flowchart of operational method and program system 1000 of FIGS. 1A, 1B and 3 for generating the composite image, for at least two of the imaging device collection members.

FIG. 14B depicts a detail flowchart of operational method and program system 1000 of FIGS. 1A, 1B and 3 for generating the composite image, for at least two of the imaging device collection members.

Arrow 1850 directs the flow of execution from starting operation 1000 to operation 1852. Operation 1852 performs providing to the motion video portal a succession of the images from the imaging device collection member for the video delivery system to present to the local participant. Arrow 1854 directs execution from operation 1852 to operation 1856. Operation 1856 terminates the operations of this flowchart.

Figure 14C:
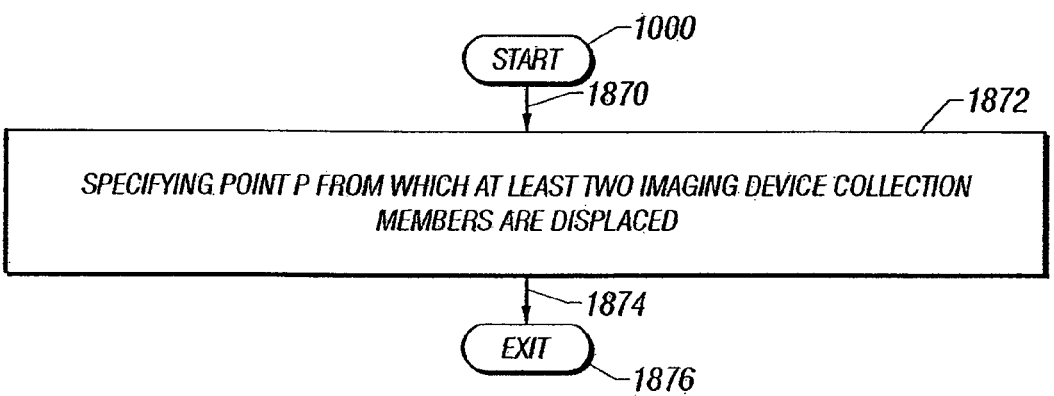
FIG. 14C depicts a detail flowchart of operational method and program system 1000 of FIGS. 1A, 1B and 3 for generating the composite image.

FIG. 14C depicts a detail flowchart of operational method and program system 1000 of FIGS. 1A, 1B and 3 for generating the composite image.

Arrow 1870 directs the flow of execution from starting operation 1000 to operation 1872. Operation 1872 performs specifying a point P from which the at least two imaging device collection members are displaced. Arrow 1874 directs execution from operation 1872 to operation 1876. Operation 1876 terminates the operations of this flowchart.

Figure 15A:
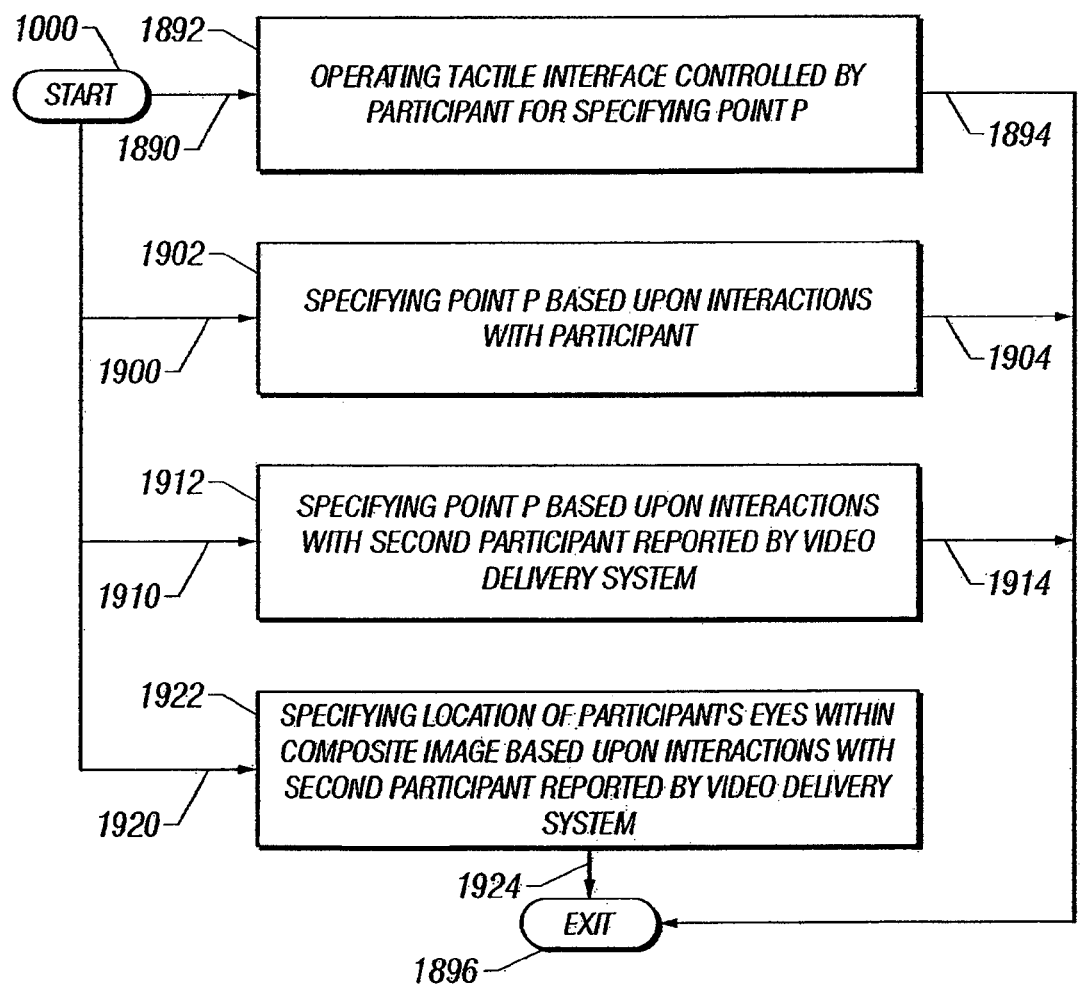
FIG. 15A depicts a detail flowchart of operation 1872 of FIG. 14C for specifying the point P.

FIG. 15A depicts a detail flowchart of operation 1872 of FIG. 14C for specifying the point P.

Arrow 1890 directs the flow of execution from starting operation 1872 to operation 1892. Operation 1892 performs operating a tactile interface controlled by the participant for specifying the point P. Arrow 1894 directs execution from operation 1892 to operation 1896. Operation 1896 terminates the operations of this flowchart.

Arrow 1900 directs the flow of execution from starting operation 1872 to operation 1902. Operation 1902 performs specifying the point P based upon interactions with the participant. Arrow 1904 directs execution from operation 1902 to operation 1896. Operation 1896 terminates the operations of this flowchart.

Arrow 1910 directs the flow of execution from starting operation 1000 to operation 1912. Operation 1912 performs specifying the point P based upon interactions with the second participant reported by the video delivery system. Arrow 1914 directs execution from operation 1912 to operation 1916. Operation 1916 terminates the operations of this flowchart.

Arrow 1920 directs the flow of execution from starting operation 1000 to operation 1922. Operation 1922 performs specifying the location of the participant's eyes within the composite image based upon information from the second participant reported by the video delivery system. Arrow 1924 directs execution from operation 1922 to operation 1916. Operation 1916 terminates the operations of this flowchart.

Note that as used herein, a tactile interface refers to at least one of a knob, a slider, a touchpad, a mouse, a trackball, and/or a keyboard.

Figure 15B:
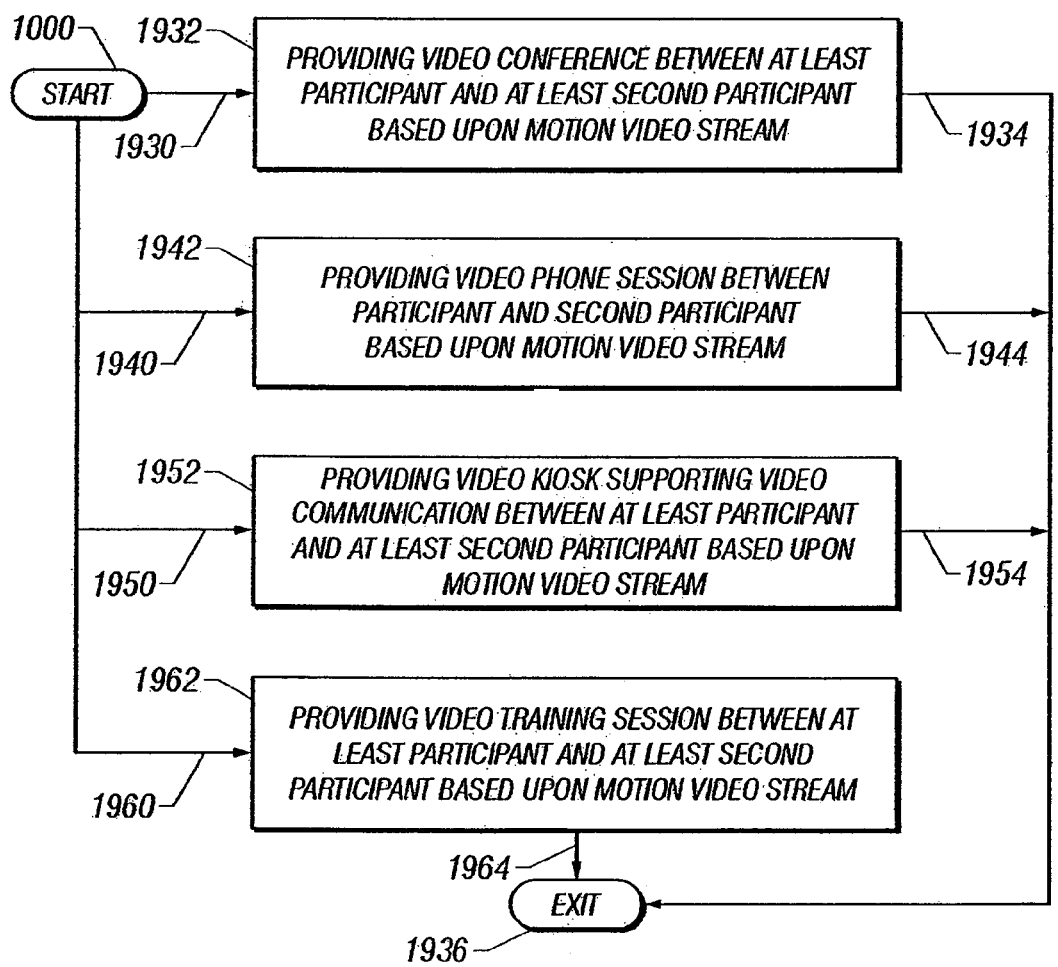
FIG. 15B depicts a detail flowchart of operational method and program system 1000 of FIGS. 1A, 1B and 3A for generating the composite image.

FIG. 15B depicts a detail flowchart of operational method and program system 1000 of FIGS. 1A, 1B, and 3A for generating the composite image.

Arrow 1930 directs the flow of execution from starting operation 1000 to operation 1932. Operation 1932 performs providing a video conference between at least the local participant and at least the second participant based upon the motion video stream. Arrow 1934 directs execution from operation 1932 to operation 1936. Operation 1936 terminates the operations of this flowchart.

Note that the video conference may be only presented to participants, or may be presented to an audience including more than just the participants. Note further that the motion video stream may include more than motion video stream versions for different participants, as well as non-participating audiences. These different versions may provide compatibility with more than one video stream format. By way of example, the non-participating audience may receive an analog video format such as NTSC or PAL, while the participants receive a digital motion format such as MPEG1 or H.261.

Arrow 1940 directs the flow of execution from starting operation 1000 to operation 1942. Operation 1942 performs providing a video phone session between the local participant and the second participant based upon the motion video stream. Arrow 1944 directs execution from operation 1942 to operation 1936. Operation 1936 terminates the operations of this flowchart.

Arrow 1950 directs the flow of execution from starting operation 1000 to operation 1952. Operation 1952 performs providing a video kiosk supporting video communication between at least the local participant and at least the second participant based upon the motion video stream. Arrow 1954 directs execution from operation 1952 to operation 1936. Operation 1936 terminates the operations is of this flowchart.

Arrow 1960 directs the flow of execution from starting operation 1000 to operation 1962. Operation 1962 performs providing a video training session between at least the local participant and at least the second participant based upon the motion video stream. Arrow 1964 directs execution from operation 1962 to operation 1936. Operation 1936 terminates the operations of this flowchart.

Note that in certain preferred embodiments, at least one of these operations are supported.

Accordingly, although the invention has been described in detail with reference to particular preferred embodiments, persons possessing ordinary skill in the art to which this invention pertains will appreciate that various modifications and enhancements may be made without departing from the spirit and scope of the claims that follow.

The invention claimed is:

1. A method of providing eye contact with a first video conferencing participant comprising the steps of:
   receiving at least two source images of said first participant;
   generating a composite image of said first participant; and
   providing said composite image to a second video conferencing participant;
   wherein each of said source images is comprised of an array of source image pixels; and
   wherein said step of generating said composite image comprises the steps of:
      calculating a dense correspondence for at least one pair of images among said source images, said dense correspondence specifying a pixel displacement for each of said source image pixels within each image within said pair of images;
      generating at least two interpolated images from said source images based upon said pixel displacement; and
      combining at least two of said interpolated images using an averaging scheme to create said composite image.

2. The method claim 1, said step of generating at least two interpolated images comprising displacing each of said source image pixels within at least two of said source images by a fraction of said pixel displacement.

3. The method of claim 2, wherein said fraction is one half.

4. The method of claim 2, wherein said source images are acquired from at least two imaging devices, and said fraction is based upon the positions of said image devices relative to a location of said second participant on a display within view of said first participant.

5. The method of claim 1, wherein said composite image comprises an array of composite image pixels;
   wherein each of said interpolated images comprises an array of interpolated image pixels; and
   wherein said averaging scheme comprises calculating values for aid composite image pixels based on a weighted average of corresponding pixels among said interpolated image pixels.

6. The method of claim 5, wherein said weighted average is based upon the location of said corresponding pixels within said interpolated images.

7. The method of claim 1, said step of generating a composite image additionally comprising the step of, before said calculating a dense correspondence step:
   applying a rectifying transformation to at least one of said source images.

8. The method of claim 1, wherein said source images are acquired from a time series of source images, and said step of generating a composite image additionally comprising the step of, before said calculating a dense correspondence step:
   applying a warping transformation to at least one of said source images to displace each of said source image pixels by a fraction of a prior pixel displacement determined from a prior dense correspondence computed for source images prior to said source images within said time series of source images.

9. The method of claim 8, wherein said fraction is less than one.

10. The method of claim 1, wherein said pixels are characterized by color values within a perceptually uniform color space.

11. The method of claim 10, wherein said color space is L*a*b* CIE.

* * * * *

UNITED STATES PATENT AND TRADEMARK OFFICE
CERTIFICATE OF CORRECTION

PATENT NO. : 7,773,108 B2  
APPLICATION NO. : 11/565496  
DATED : August 10, 2010  
INVENTOR(S) : W. Daniel Hillis et al.

Page 1 of 1

It is certified that error appears in the above-identified patent and that said Letters Patent is hereby corrected as shown below:

Title Page item 63

Please insert to RELATED U.S. APPLICATION DATA section of the p:

--...which claims priority to U.S. Patent Application Serial No. 09/995,272, filed on November 27, 2001, which claims priority to Provisional Application Serial No. 60/250,955, filed on November 29, 2000.--

Signed and Sealed this  
Twentieth Day of September, 2011

David J. Kappos  
*Director of the United States Patent and Trademark Office*